(12) United States Patent
Gao et al.

(10) Patent No.: US 11,796,879 B2
(45) Date of Patent: Oct. 24, 2023

(54) ARRAY SUBSTRATE, DISPLAY PANEL AND DISPLAY DEVICE

(71) Applicant: Xiamen Tianma Micro-Electronics Co., Ltd., Xiamen (CN)

(72) Inventors: Jiao Gao, Xiamen (CN); Yingzhang Qiu, Xiamen (CN); Limin Lin, Xiamen (CN); Xiaoli Liu, Xiamen (CN); Yongjin Teng, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 115 days.

(21) Appl. No.: 17/416,511

(22) PCT Filed: Jun. 22, 2020

(86) PCT No.: PCT/CN2020/097321
§ 371 (c)(1),
(2) Date: Jun. 20, 2021

(87) PCT Pub. No.: WO2021/217830
PCT Pub. Date: Nov. 4, 2021

(65) Prior Publication Data
US 2022/0334422 A1     Oct. 20, 2022

(30) Foreign Application Priority Data
Apr. 30, 2020   (CN) .......................... 202010366733.2

(51) Int. Cl.
G02F 1/1368     (2006.01)
G02F 1/1362     (2006.01)

(52) U.S. Cl.
CPC ...... G02F 1/1368 (2013.01); G02F 1/136209 (2013.01); G02F 1/136227 (2013.01)

(58) Field of Classification Search
CPC ............. G02F 1/136227; G02F 1/1368; G02F 1/136209
See application file for complete search history.

(56) References Cited

U.S. PATENT DOCUMENTS

| | | | |
|---|---|---|---|
| 2011/0080542 A1* | 4/2011 | Huang | ............. G02F 1/136209 257/E33.053 |
| 2014/0104527 A1 | 4/2014 | Yang et al. | |
| 2016/0291393 A1 | 10/2016 | Han et al. | |
| 2019/0094636 A1 | 3/2019 | Kang et al. | |

FOREIGN PATENT DOCUMENTS

| | | |
|---|---|---|
| CN | 203521413 U | 4/2014 |
| CN | 104062800 A | 9/2014 |
| CN | 104090434 A | 10/2014 |

(Continued)

*Primary Examiner* — Lucy P Chien
(74) *Attorney, Agent, or Firm* — KILPATRICK TOWNSEND & STOCKTON, LLP

(57) ABSTRACT

Provided are an array substrate, a display panel, and a display device. The array substrate includes a base substrate, a thin-film transistor disposed on one side of the base substrate, a pixel electrode, and at least two color resist layers disposed between the TFT and the pixel electrode. A medium layer is disposed between any two adjacent color resist layers. The pixel electrode is electrically connected to a first electrode of the thin-film transistor through a via.

16 Claims, 19 Drawing Sheets

(56) References Cited

FOREIGN PATENT DOCUMENTS

| CN | 104698709 A | 6/2015 |
| CN | 107957822 A | 4/2018 |
| CN | 109634014 A | 4/2019 |
| CN | 109671726 A | 4/2019 |
| CN | 111045267 A | 4/2020 |

* cited by examiner

# ARRAY SUBSTRATE, DISPLAY PANEL AND DISPLAY DEVICE

CROSS-REFERENCE TO RELATED APPLICATIONS

This is a National Stage Application filed under 35 U.S.C. 371 based on International Patent Application No. PCT/CN2020/097321, filed on Jun. 22, 2020, which claims priority to Chinese Patent Application No. 202010366733.2 filed on Apr. 30, 2020, the disclosures of both of which are incorporated herein by reference in their entireties.

FIELD

The present application relates to the field of display technology, for example, an array substrate, a display panel, and a display device.

BACKGROUND

The development of display technology spurs an increasingly higher demand for the display effect of display screens. For example, when a display screen is bent into a curved shape and applied to a vehicle-mounted display device, the viewing angle of the vehicle-mounted display device can be enlarged so that the display difference perceived by human eyes at different viewing angles is narrowed.

Liquid crystal display panels, with the advantages of low power consumption, no radiation, and soft display screen, are widely used in various display devices. Nonetheless, as people raise their requirement for the color richness of the images displayed by a liquid crystal display panel, how to widen the color gamut of the liquid crystal display panel has become a problem to be solved currently.

SUMMARY

The embodiments of the present application provide an array substrate, a display panel, and a display device to reduce the puncturing difficulty, boost the product yield, and enhance the display effect.

Embodiments of the present application provide an array substrate.

The array substrate includes a base substrate; a thin-film transistor disposed on a side of the base substrate, which includes at least a first electrode; a pixel electrode disposed on a side of the thin-film transistor facing away from the base substrate; and at least two color resist layers disposed between the thin-film transistor and the pixel electrode. A medium layer is disposed between any two adjacent color resist layers.

The pixel electrode is electrically connected to the first electrode of the thin-film transistor through a via. The via penetrates through the at least two color resist layers and the medium layer disposed between the any two adjacent color resist layers.

In the embodiments of the present application further provide a display panel.

The display panel includes the preceding array substrate; an opposing substrate disposed opposite to the array substrate; and a liquid crystal layer and a support column that are disposed between the opposing substrate and the array substrate.

In the embodiments of the present application further provide a display device. The display device includes the preceding display panel.

DETAILED DESCRIPTION

Figure 1:
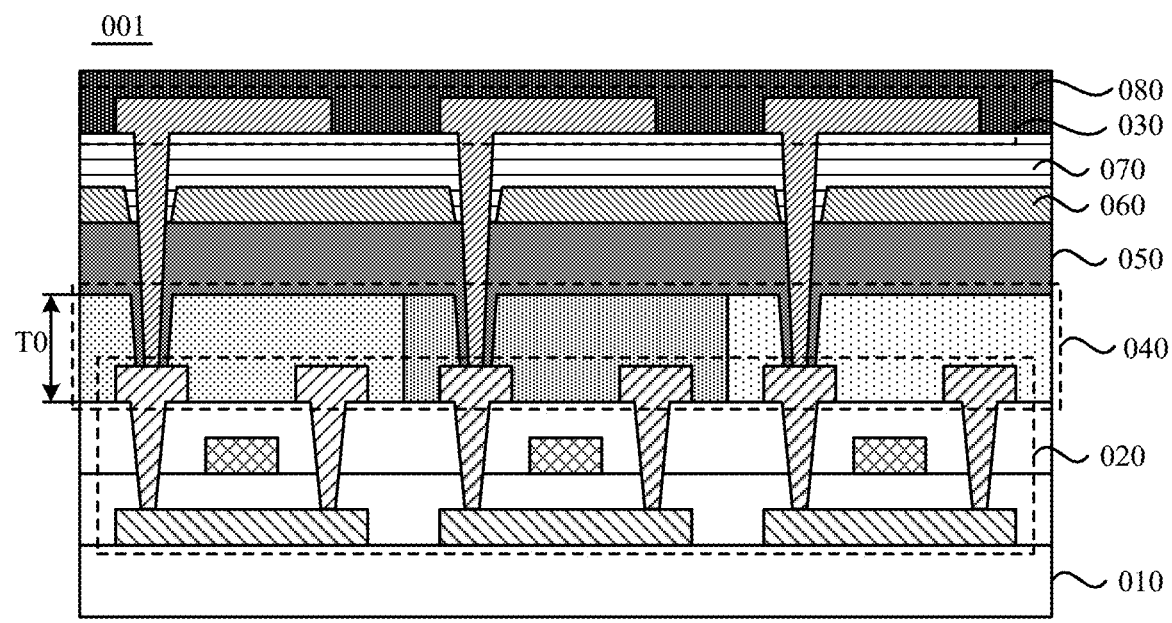
FIG. 1 is a diagram illustrating the structure of an array substrate according to the related art.

The present application is further described in detail in conjunction with the drawings and the embodiments. Additionally, it is to be noted that for ease of description, only part, not all, of structures related to the present application are illustrated in the drawings.

A liquid crystal display screen generally includes a backlight device and a liquid crystal display panel. The backlight device can provide a light source for the liquid crystal display panel. The liquid crystal display panel includes a color film substrate, a thin-film transistor (TFT) array substrate, and a liquid crystal layer disposed between the color film substrate and the TFT array substrate. The TFT array substrate of the liquid crystal display panel is equipped with a TFT, a pixel electrode, and a common electrode. The control in which the TFT is conductive enables pixel voltage signals to pass through the conductive TFT to the corresponding pixel electrode. In this case, the pixel electrode can form an electric field with the common electrode. The electric field can trigger liquid crystal molecules at corresponding positions in the liquid crystal layer to deflect, and thus the light source provided by the backlight device penetrates through the liquid crystal molecules at the corresponding positions to reach the color film substrate. The color film substrate includes a color resist layer and a light-blocking layer. The light-blocking layer can block the positions needing no light transmission to avoid unnecessary light leakage. The color resist layer includes color resist patterns of different colors. The light source penetrating through liquid crystal molecules at corresponding positions can display colorful images after passing through the color resist patterns of corresponding colors.

In the related art, to enlarge the viewing angle of the liquid crystal display panel, the liquid crystal display panel is typically bent into a curved shape. The light-blocking layer and the color resist layer of the curved liquid crystal display panel are disposed on the color film substrate; while the corresponding TFT, pixel electrode, and metal traces are disposed in the array substrate. When the liquid crystal display panel is bent into a curved shape, both the array substrate and the color film substrate are deformed. As a result, the light-blocking positions in the light-blocking layer fail to align with the positions to be blocked in the array substrate accurately. Accordingly, light leakage is generated when the light source provided by the backlight device is transmitted to the liquid crystal panel and makes the liquid crystal display panel luminous, and thus the display effect of the display panel is affected.

FIG. 1 is a diagram illustrating the structure of an array substrate according to the related art. As shown in FIG. 1, to solve the inaccurate alignment problem, a TFT array 020, a pixel electrode layer 030, a light-blocking layer 080, a color resist layer 040, a planarization layer 050, and a common electrode layer 060 are disposed on a side of a base substrate 010 in an array substrate 001. The color resist layer 040, the planarization layer 050, and the common electrode layer 060 are successively disposed between the TFT array 020 and the pixel electrode layer 030. An insulating layer 070 is disposed between the common electrode layer 060 and the pixel electrode layer 030. In this manner, both the light-blocking layer 080 and the color resist layer 040 are disposed in the array substrate 001. Accordingly, when the array substrate 001 is bent, the extruding deformation may not cause an inaccurate alignment between the light-blocking layer 080 and the positions to be blocked in the array substrate 001, thus not generating light leakage. Correspondingly, a pixel electrode in the pixel electrode layer 030 is electrically connected to a TFT in the TFT array 020 through a via so that the TFT can transmit pixel voltage signals to the electrically connected pixel electrode. The pixel electrode forms an electric field with a common electrode in the common electrode layer 060. The electric field triggers liquid crystal molecules in the liquid crystal layer in the liquid crystal display panel equipped with the array substrate 001 to deflect. In this manner, the via must penetrate through layers including at least the insulating layer 070, the planarization layer 050, and the color resist layer 040.

With this arrangement, the light source provided by a backlight device can penetrate through the array substrate 001, the liquid crystal layer, and the opposing substrate disposed opposite to the array substrate 001 successively to make the liquid crystal display panel luminous. Additionally, the color resist patterns in the color resist layer 040 in the array substrate 001 may convert the light source provided by the backlight device to the light of corresponding colors, thus enabling the liquid crystal display panel to display colorful images.

Figure 2:
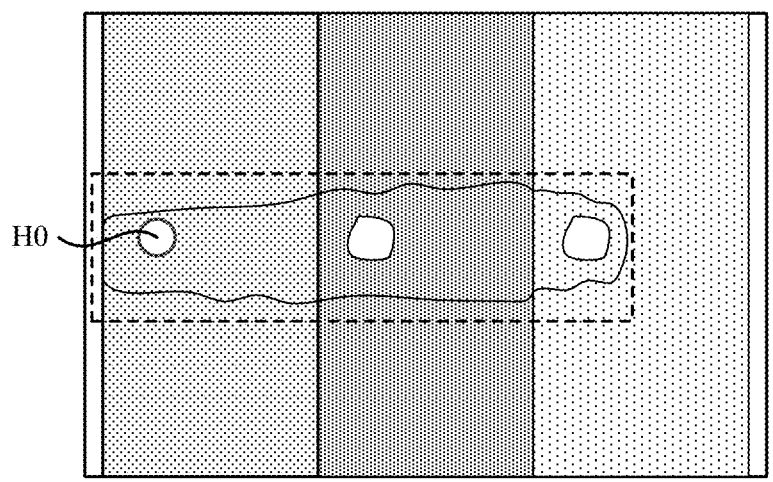
FIG. 2 is a top view illustrating the structure of the array substrate according to the related art.
Figure 3:
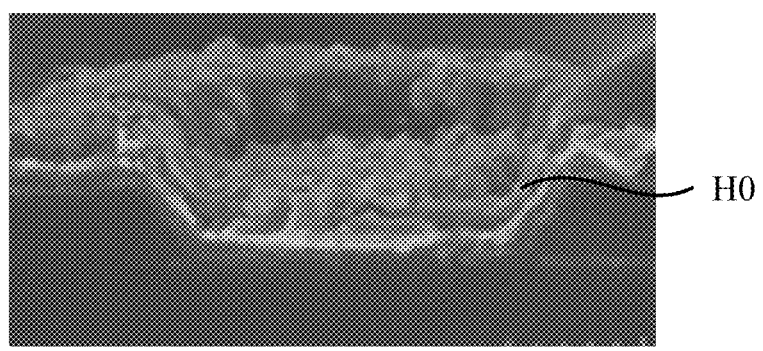
FIG. 3 is a microscopic image illustrating the interior structure of a via in the array substrate according to the related art.

The thickness of the color resist layer is related to the color gamut of light emission and display of the liquid crystal display panel. With the same color resist material, the greater the thickness of the color resist layer, the wider the color gamut. Accordingly, it is necessary to increase the thickness of the color resist layer to widen the color gamut of light emission and display. However, in the related art shown in FIG. 1, the color resist layer 040 is disposed between the TFT array 020 and the pixel electrode layer 030. When the thickness T0 of the color resist layer 040 is relatively great, the via penetrating through layers between the pixel electrode and the TFT has a relatively great depth, thus increasing the difficulty in the via manufacturing process. Additionally, the relatively great thickness T0 of the color resist layer 040 may likely cause over-etching or under-etching when the via is manufactured through processes including photolithography and etching. As shown in FIG. 2, over-etching may damage the color resist patterns around the via H0, thus affecting the display effect of the display panel. As shown in FIG. 3, under-etching may generate residues of color resist materials inside the via H0, thus affecting the electric connection and resulting in poor contact between the pixel electrode and the TFT, as well as affecting the display effect of the display panel.

An embodiment of the present application provides an array substrate. The array substrate includes a base substrate, a TFT disposed on a side of the base substrate and including at least a first electrode, a pixel electrode disposed on the side of the TFT facing away from the base substrate, and at least two color resist layers disposed between the TFT and the pixel electrode. A medium layer is disposed between any two adjacent color resist layers. The pixel electrode is electrically connected to the first electrode of the TFT through a via.

In the embodiments, the TFT, the pixel electrode, and the at least two color resist layers disposed between the pixel electrode and TFT are disposed on one side of the substrate. The at least two color resist layers have a relatively great total thickness, satisfying the display requirement of a wide color gamut and thus enhancing the display effect of the display panel. Additionally, since a color resist layer satisfying the display requirement of a wide color gamut is divided into at least two color resist layers, each of the at least two color resist layers has a relatively less thickness compared with a single color resist layer required by the same color gamut. With a medium layer disposed between two adjacent color resist layers, the manufacturing of the via penetrating through the layers between a pixel electrode and the layer carrying a first electrode of a TFT can be implemented separately in each color resist layer. The color resist patterns on corresponding color resist layers are prevented from being damaged. Accordingly, the via manufacturing difficulty is reduced, the in-via residues and the color resist layer damages lessened, the product yield boosted, and thus the display effect enhanced.

The embodiments of the present application are described clearly and completely hereinafter in conjunction with the drawings in the embodiments of the present application.

Figure 4:
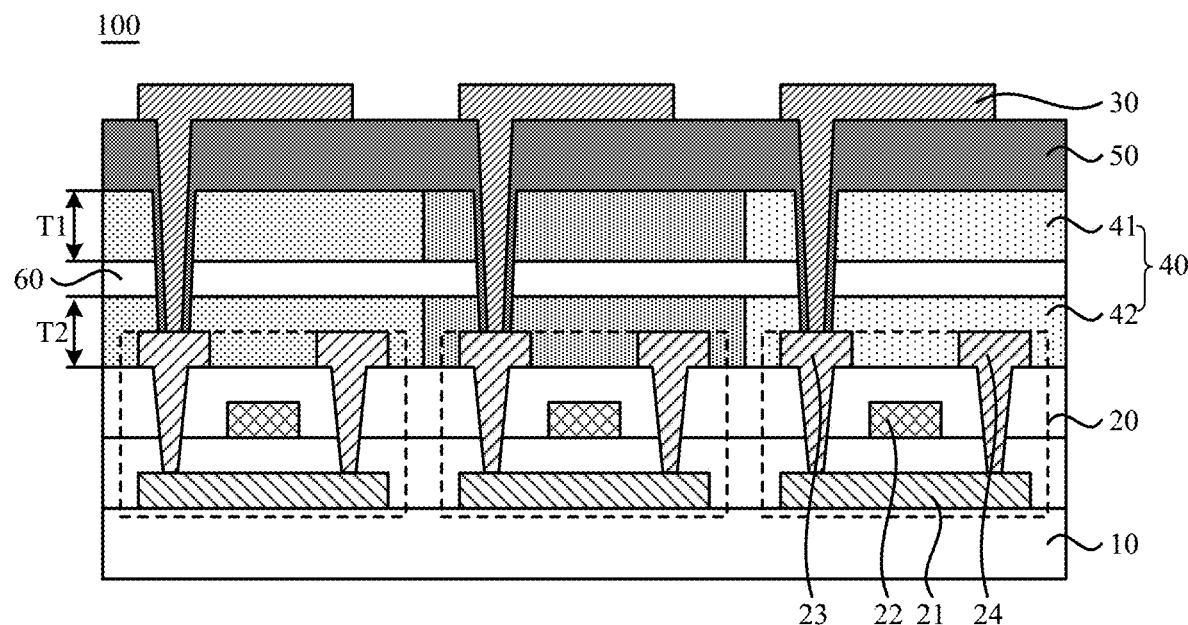
FIG. 4 is a diagram illustrating the layer structure of an array substrate according to the embodiments of the present application.

FIG. 4 is a diagram illustrating the layer structure of an array substrate according to an embodiment of the present disclosure. As shown in FIG. 4, a TFT 20 is disposed on a side of a base substrate 10 in an array substrate 100. The TFT 20 includes at least a first electrode 23. The first electrode 23 of the TFT 20 may be a source or a drain of the TFT 20. The TFT 20 may further include an active layer 21, a gate 22, and a second electrode 24. The application of a gate voltage signal to the gate 22 of the TFT 20 can make the first electrode 23 and the second electrode 24 of the TFT 20 conductive so that a corresponding pixel voltage signal can pass through the TFT 20. Since the first electrode 23 of the TFT 20 may be the source or the drain of the TFT 20, correspondingly, the second electrode 24 of the TFT 20 may be the drain or the source of the TFT 20. That is, when the first electrode 23 of the TFT 20 works as the source of the TFT 20, the second electrode 24 of the TFT 20 works as the drain of the TFT; when the first electrode 23 of the TFT 20 works as the drain of the TFT, the second electrode 24 of the TFT 20 works as the source of the TFT.

It is to be noted that FIG. 4 is only an exemplary drawing in an embodiment of the present application. In FIG. 4, the TFT 20 is a top-gate TFT, that is, the gate 22 of the TFT 20 is disposed on the side of the active layer 21 facing away from the base substrate 10. In an embodiment of the present application, a gate of a TFT may be disposed on the side of an active layer of the TFT facing the base substrate, that is, the TFT is a bottom-gate TFT. In one embodiment, a gate of a TFT is disposed both on the side of the TFT facing the base substrate and on the side of the TFT facing away from the base substrate, that is, the TFT is a double-gate TFT.

Further referring to FIG. 4, the base substrate 100 further includes a pixel electrode 30 disposed on the side of the TFT 20 facing away from the base substrate 10. The pixel electrode 30 is electrically connected to the first electrode of the TFT 20 through a via. In this manner, when gate signals are applied to the gate 22 of the TFT 20 to make the first electrode 23 and the second electrode 24 conductive, the TFT 20 can transmit pixel voltage signals to the corresponding pixel electrode 30 to make the position of the pixel electrode 30 luminous.

At least two color resist layers 40 are disposed between the pixel electrode 30 and the TFT 20. Each of the color resist layers (41 and 42) may be arranged with the color resist patterns of different colors. Accordingly, the monochromatic light can turn colorful after passing through each color resist pattern in the color resist layers (41 and 42). With the array substrate 100 applied to a display panel, the display panel can implement a color display with no need for a color resist layer disposed on an opposing substrate disposed opposite to the array substrate 100. In this manner, when the display panel including the array substrate 100 is bent into a curved shape, the alignment between the array substrate 100 and the opposing substrate needs no consideration, helping increase the puncturing ratio of the display panel and thus enhance the display effect of the display panel. Meanwhile, the thickness of a color resist layer is related to the color gamut of light emission and display. That is, within a range and with the same color resist material, the greater the thickness of a color resist layer, the wider the color gamut of light emission and display. Accordingly, the arrangement in which at least two color resist layers (41 and 42) are disposed between the pixel electrode 30 and the TFT 20 enables the at least two color resist layers 40 in the array substrate 100 to have a relatively great total thickness (T1+T2), thus guaranteeing a wide color gamut for the display panel equipped with the array substrate 100 and further enhancing the display effect of the display panel.

Additionally, a medium layer 60 is disposed between any two adjacent color resist layers (41 and 42) of the at least two color resist layers 40 so that the color resist layers (41 and 42) are disposed separately. In this case, when the pixel electrode 30 is electrically connected to the first electrode 23 of the TFT 20 through the via, the via at least penetrates through the at least two color resist layers 40 disposed between the pixel electrode 30 and the TFT 20, as well as the medium layer 60 disposed between any two adjacent color resist layers (41 and 42). In this manner, the manufacturing of the via penetrating through layers between the pixel electrode 30 and the layer carrying the first electrode 23 of the TFT 20 may be implemented separately on each of the at least two color resist layers 40.

Exemplarily, FIG. 4 shows an example in which the at least two color resist layers 40 include two color resist layers 41 and 42. The color resist layer 42, after being formed, is punctured at a corresponding position to expose the first electrode 23 of the TFT 20. The puncturing depth of the color resist layer 42 equals the thickness T2 of the color resist layer 42. Then the medium layer 60 is disposed on the side of the color resist layer 42 facing away from the base substrate 10. The medium layer 60 may cover the color resist layer 42 and fill the puncturing position in the color resist layer 42 to form a relatively planar surface on the side of the medium layer 60 facing away from the color resist layer 42. That is, the medium layer 60 can fill the puncturing position and the recesses caused by the patterning on the color resist layer 42. In this manner, the height difference between the protrusions and recesses on the surface of the medium layer 60 facing away from the base substrate 10 is reduced, and thus a relatively planar surface is formed. Afterward, a color resist layer 41 is formed on the side of the medium layer 60 facing away from the color resist layer 42. When the color resist material used for manufacturing the color resist layer 41 is different from the medium material used for manufacturing the medium layer 60, the puncturing process for the color resist layer 41 differs from the puncturing process for the medium layer 60. For example, the color resist layer 41 may be punctured through exposure and development, while the medium layer 60 may be punctured through dry etching. In this case, the color resist layer 41 may be punctured at a corresponding position 41 through exposure and development, with the puncturing depth equaling the thickness T1 of the color resist layer 41; then the medium layer 60 is punctured through dry etching to expose the first electrode 23 of the TFT 20. When the color resist layer 41 is punctured, the medium layer 60 disposed between the color resist layer 41 and the color resist layer 42 can protect the color resist layer 42 disposed on the side of the medium layer 60 facing the base substrate 10. Accordingly, the color resist layer 42 can be prevented from being damaged by puncturing the color resist layer 41. Meanwhile, the color resist layer 41, the color resist layer 42, and the medium layer disposed between the color resist layer 41 and the color resist layer 42 are punctured separately. With this arrangement, each of the color resist layers (41 and 42) has a relatively small puncturing depth, and thus the via manufacturing difficulty is reduced.

In this manner, the arrangement in which each of the at least two color resist layers to disposed between the pixel electrode 30 and the TFT 20 as well as the medium layer 60 disposed between the two adjacent color resist layers 41 and 42 are punctured separately enables each of the color resist layers (41 and 42) to have a relatively small puncturing depth, thus reducing the via manufacturing difficulty. Meanwhile, the medium layer 60 disposed between the two adjacent color resist layers 41 and 42 can protect the color resist layer 41 disposed on the side of the medium layer facing the base substrate 10. Accordingly, the in-via residues caused by under-etching and the damages to the color resist patterns on the color resist layers caused by over-etching are lessened, the product yield boosted, the production cost lowered, and thus the display effect enhanced. The material used for manufacturing the medium layer disposed between the two adjacent color resist layers may be an organic material or an inorganic material.

Additionally, in the case where the medium layer 60 and the color resist layer 41 may be punctured using the same puncturing process, after the color resist layer 42 is formed and punctured, the medium layer 60 and the color resist layer 42 may be formed successively and punctured using the same puncturing process. The formed medium layer 60 may fill the opening in the color resist layer 42. Accordingly, during the puncturing on the medium layer 60 and the color resist layer 42, the medium layer 60 disposed surrounding the opening on the color resist layer 42 may protect the color resist layer 42. In this manner, the color resist layer 42 cannot be damaged by over-etching when the color resist layer 41 and the medium layer 60 are punctured.

It is to be noted that FIG. 4 is only an exemplary drawing in an embodiment of the present application and exemplarily illustrates the array substrate 100 including two color resist layers. In embodiments of the present application, the number of the color resist layers in the array substrate may be two, three, or more.

In one embodiment, the array substrate further includes a planarization layer disposed between the pixel electrode and the TFT. The planarization layer can flatten the protrusions and recesses caused by the patterning in layers between the planarization layer and the base substrate, such as layers in the TFT. Therefore, the uneven display caused by the thickness difference between positions in the array substrate does not occur. The at least two color resist layers disposed between the pixel electrode and the TFT may be disposed between the planarization layer and the pixel electrode. In one embodiment, the at least two color resist layers disposed between the pixel electrode and the TFT may be disposed between the planarization layer and the TFT. In one embodiment, the at least two color resist layers may include at least one first color resist layer and at least one second color resist layer. The at least one first color resist layer may be disposed between the planarization layer and the pixel electrode. The at least one second color resist layer may be disposed between the pixel electrode and the TFT.

Exemplarily, further referring to FIG. 4, a planarization layer 50 and the at least two color resist layers 40 are disposed between the pixel electrode 30 and the TFT 20 in the array substrate 100. The at least two color resist layers 40 include the color resist layer 41 and the color resist layer 42. Both the color resist layer 41 and the color resist layer 42 are disposed between the planarization layer 50 and the TFT 20. That is, the at least two color resist layers 40 are disposed on the side of the planarization layer 50 facing the base substrate 10. In this case, the planarization layer 50 can flatten the protrusions and recesses caused by both the patterning in each of the color resist layers (41 and 42) in the at least two color resist layers 40 and the patterning in each layer in the TFT 20. Therefore, the relatively large thickness difference between positions in the array substrate is avoided, the uneven display prevented, and thus the display uniformity improved. In this case, the via is manufactured in the following steps to penetrate through layers between the pixel electrode 30 and the layer carrying the first electrode 23 of the TFT 20. Firstly, the color resist layer 42 is formed and punctured. Secondly, the medium layer 60 and the color resist layer 41 are formed successively and punctured separately. Lastly, the planarization layer 50 is formed on the side of the color resist layer 41 facing away from the base substrate 10 and puncture to expose the first electrode 23 of the TFT 20. Correspondingly, in the case where the planarization layer 50 and the medium layer 60 disposed between the two adjacent color resist layers 41 and 42 are made of the same material, or in the case where the medium layer 60 and the planarization layer 50 are made of different materials but punctured using the same puncturing process, the following steps can be performed. Firstly, the color resist layer 42 is formed and punctured. Secondly, the medium layer and the color resist layer 41 are formed successively. Thirdly, the color resist layer 41 is punctured. Fourthly, the planarization layer 50 is formed on the side of the color resist layer 41 facing away from the base substrate 10. Lastly, the planarization layer 50 as well as the medium layer 60 disposed between the two adjacent color resist layers 41 and 42 are puncture simultaneously. In this manner, each of the color resist layers (41 and 42) may also have a relatively small puncturing depth.

Figure 5:
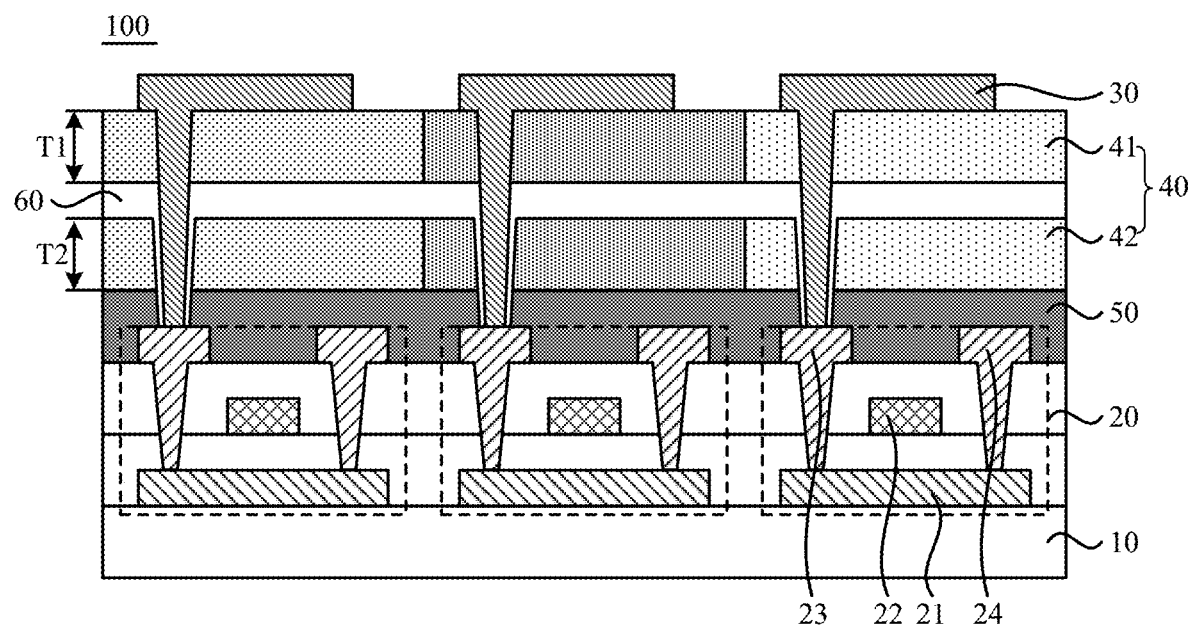
FIG. 5 is a diagram illustrating the layer structure of another array substrate according to an embodiment of the present application.

Exemplarily, FIG. 5 is a diagram illustrating the layer structure of another array substrate according to an embodiment of the present application. For the similarities between FIG. 5 and FIG. 4, refer to the preceding description of FIG. 4. Only the differences between FIG. 5 and FIG. 4 are exemplarily described here. As shown in FIG. 5, the planarization layer 50 is disposed between the TFT 20 and the at least two color resist layers 40. In this case, the planarization layer 50 can flatten the protrusions and recesses caused by the patterning in each layer in the TFT 20 disposed between the planarization layer 50 and the base substrate 10. In this manner, the at least two color resist layers 40 disposed on the side of the planarization layer facing away from the base substrate 10 can be manufactured on a relatively planar surface, ensuring that at each position, the thickness of the color resist layer 41 is consistent with the thickness of the color resist layer 42. Accordingly, the color gamut and the luminance of light emission and display at each position tend to be consistent, and thus the effect of light emission and the display is enhanced.

Figure 6:
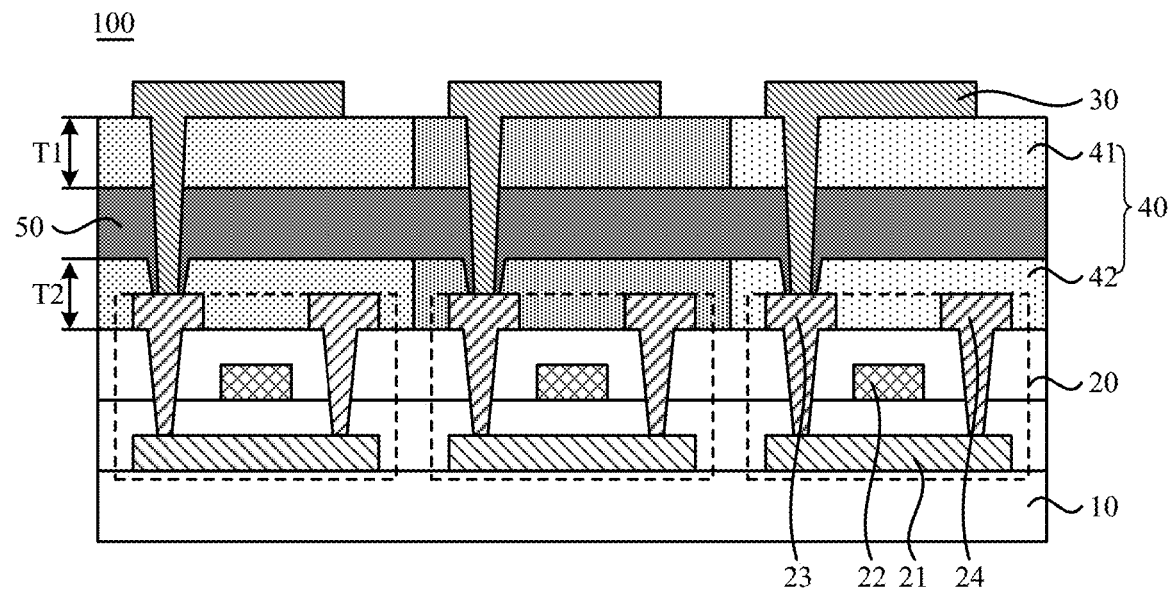
FIG. 6 is a diagram illustrating the layer structure of another array substrate according to an embodiment of the present application.

Exemplarily, FIG. 6 is a diagram illustrating the layer structure of another array substrate according to an embodiment of the present application. For the similarities between FIG. 6 and FIGS. 4 and 5, refer to the preceding description of FIGS. 4 and 5. Only the differences between FIG. 6 and FIGS. 4 and 5 are exemplarily described here. As shown in FIG. 6, the planarization layer 50 is disposed between the two adjacent color resist layers 41 and 42. The color resist layer 41 disposed between the planarization layer 50 and the pixel electrode 30 is a first color resist layer, and the color resist layer 42 disposed between the planarization layer 50 and the TFT 20 is a second color resist layer. In this manner, the planarization layer 50 can flatten the protrusions and recesses caused by the patterning on the TFT 20 and the second color resist layer 42. Meanwhile, the planarization layer 50 can work as a medium layer between the adjacent first color resist layer 41 and the second color resist layer 42. In this case, no additional medium layer is needed between the adjacent first color resist layer 41 and the second color resist layer 42, simplifying the manufacturing process of the array substrate 100, lowering the array substrate 100, and thus facilitating the thinning of the display panel equipped with the array substrate 100. Correspondingly, the planarization layer 50 may be formed after the second color resist layer 42 is formed and punctured. The planarization layer 50 may flatten the protrusions and recesses caused by the patterning and the puncturing on the second color resist layer 42, thus generating a relatively planar surface on the side of the planarization layer 50 facing away from the base substrate 10. Then the first color resist layer 41 is formed on the side of the planarization layer 50 facing away from the base substrate 10 and punctured. Afterward, the planarization layer 50 is punctured to expose the first electrode 23 of the TFT 20. In this manner, the planarization layer 50, as a medium layer between the first color resist layer 41 and the second color resist layer 42, enables each of the color resist layers (41 and 42) to be punctured separately with a relatively small puncturing depth. Therefore, the via manufacturing difficulty is reduced, the product yield boosted, and the production cost lowered. In one embodiment, under the premise of not considering the manufacturing process, both the planarization layer 50 and the medium layer may be disposed between the adjacent first color resist layer 41 and the second color resist layer 42.

Additionally, it is to be noted that FIGS. 4 to 6 are only exemplary drawings in an embodiment of the present application. In FIGS. 4 to 6, the array substrate 100 includes two color resist layers 41 and 42. In an embodiment of the present application, the at least two color resist layers may include two layers, three layers, or more layers. Correspondingly, the at least one first color resist layer may include one layer, two layers, or more layers. The at least one second color resist layer may include one layer, two layers, or more layers.

In one embodiment, the array substrate further includes a common electrode. The common electrode is disposed between the planarization layer and the pixel electrode. The common electrode may be an entire-plane structure, bar structure, or block structure.

With this arrangement, both the common electrode and the pixel electrode are disposed in the array substrate. For the display panel equipped with the array substrate, common voltage signals are applied to the common electrode, and pixel voltage signals are applied to the pixel electrode. In this manner, the common electrode and the pixel electrode in the array substrate can form an in-plane field to trigger liquid crystal molecules in the liquid crystal layer of the display panel to deflect. Accordingly, the light, after penetrating through the liquid crystal layer, can display images of a wide color gamut on the display surface of the display panel. Correspondingly, at least one insulating layer may be disposed between the common electrode and the pixel electrode to make the common electrode and the pixel electrode insulate from each other. Thus mutual interference is avoided between common voltage signals on the common electrode 80 and pixel voltage signals on the pixel electrode, and the display effect is not affected.

It is to be noted that when the common electrode disposed between the pixel electrode and the TFT is a plane structure, the via electrically connecting the pixel electrode and the TFT may penetrate through the layer carrying the common electrode. When the common electrode is a bar structure, the via may be disposed between two adjacent common electrodes and penetrate through the insulating layers between the two adjacent common electrodes.

For ease of description, the embodiments of the present application are described exemplarily hereinafter with an example in which the common electrode is a plane structure.

Additionally, since at least two color resist layers are disposed in the array substrate between the pixel electrode and the TFT, the relative location between the common electrode and the at least two color resist layers may be determined on the basis of the layer structure between the at least two color resist layers and the planarization layer.

Figure 7:
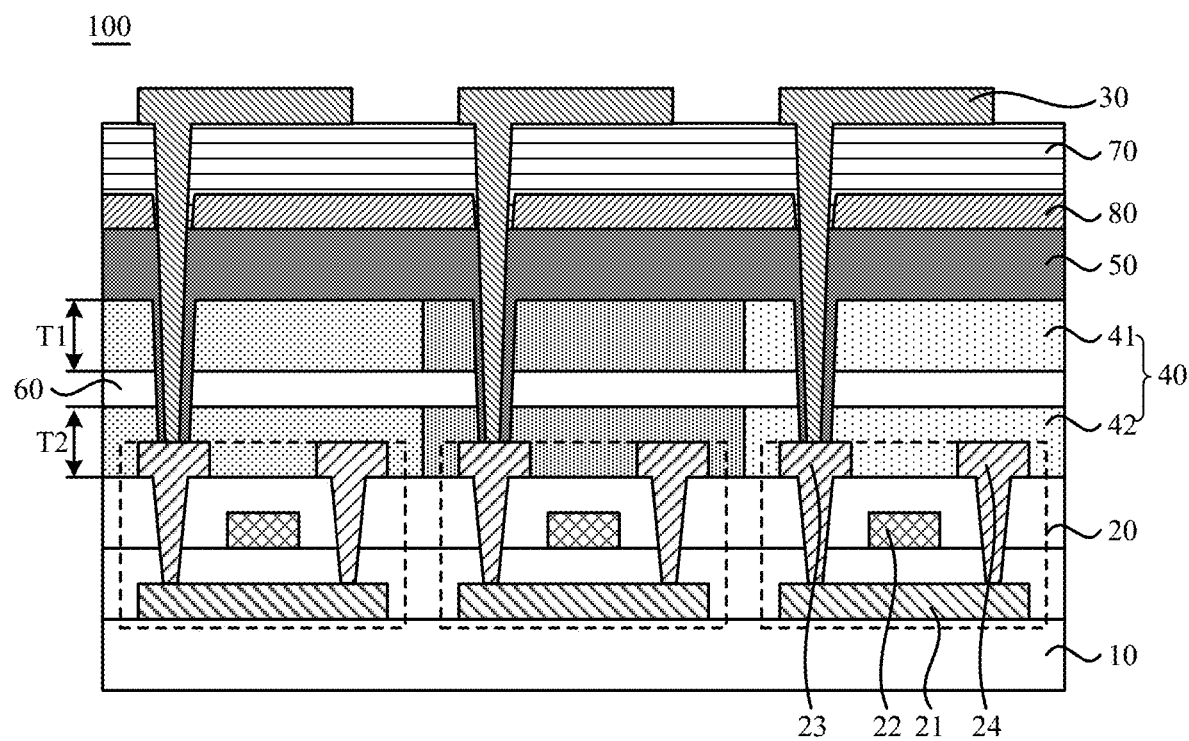
FIG. 7 is a diagram illustrating the layer structure of another array substrate according to an embodiment of the present application.

Exemplarily, FIG. 7 is a diagram illustrating the layer structure of another array substrate according to an embodiment of the present application. As shown in FIG. 7, the at least two color resist layers 40 include the color resist layer 41 and the color resist layer 42. Both the color resist layer 41 and the color resist layer 42 are disposed between the planarization layer 50 and the TFT 20. In this case, a common electrode 80 may be disposed on the side of the planarization layer 50 facing away from the at least two color resist layers 40, and an insulating layer 70 is disposed between the pixel electrode 30 and the common electrode 80. In this manner, after the at least two color resist layers 40 are punctured at corresponding positions, the planarization layer 50 may be formed on the side of the at least two color resist layers 40 facing away from the base substrate 10 and fill the puncturing positions at the color resist layers 41 and/or 42. The recesses and protrusions caused by the patterning are flattened, and the color resist patterns at the puncturing positions in the color resist layers 41 and/or 42 are prevented from over-etching. Afterward, the common electrode 80 is formed on the side of the planarization layer 50 facing away from the base substrate, and then the layer carrying the common electrode 80 is punctured at a corresponding position. After that, the insulating layer 70 is formed on the side of the common electrode 80 facing away from the base substrate 10. The insulating layer 70 may cover the common electrode 80 so that mutual interference is avoided between common voltage signals on the common electrode 80 and pixel voltage signals on the pixel electrode 30, and thus the display effect is not affected. Meanwhile, the insulating layer 70 further fills the puncturing position in the layer carrying the common electrode 80. The insulating layer disposed at the puncturing position can make the common electrode 80, the pixel electrode 30, and the first electrode 23 of the TFT 20 insulate from one another. Accordingly, mutual interference is avoided between common voltage signals on the common electrode 80 and pixel voltage signals on the pixel electrode 30, and the display effect is enhanced.

In one embodiment, when the at least two color resist layers are disposed between the pixel electrode and the planarization layer, the common electrode may be disposed between the planarization layer and the at least two color resist layers. In one embodiment, the common electrode is disposed between the pixel electrode and the at least two color resist layers. In one embodiment, the common electrode is disposed between the two adjacent color resist layers.

Figure 8:
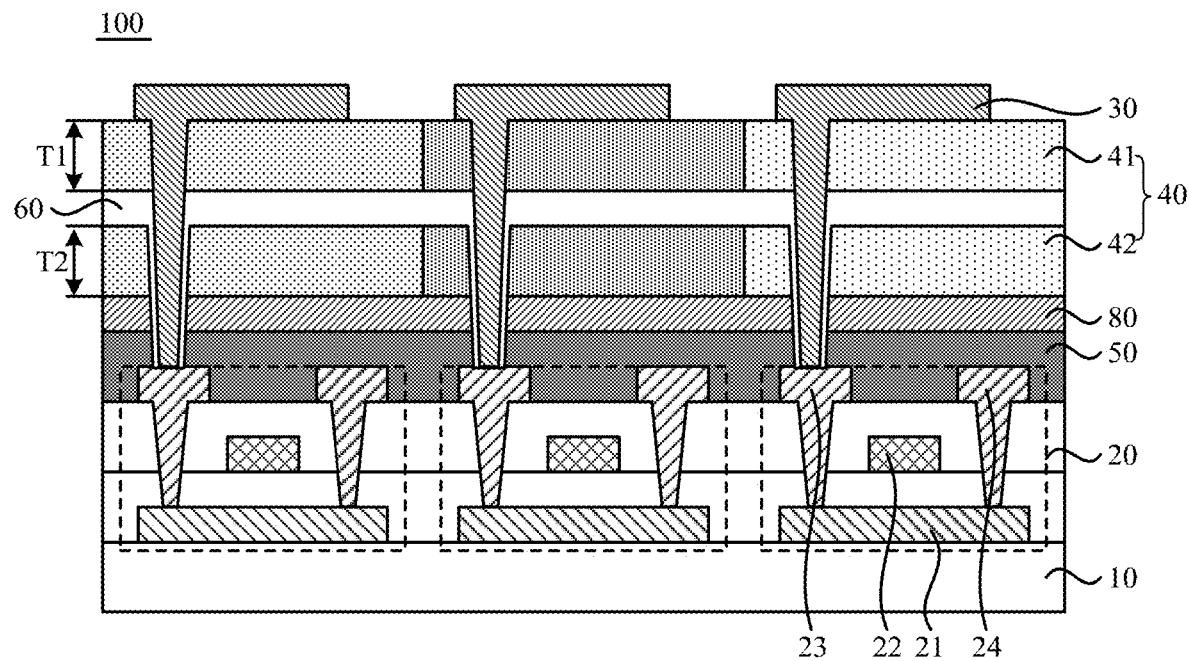
FIG. 8 is a diagram illustrating the layer structure of another array substrate according to an embodiment of the present application.

Exemplarily, FIG. 8 is a diagram illustrating the layer structure of another array substrate according to an embodiment of the present application. As shown in FIG. 8, the at least two color resist layers 40 include the color resist layer 41 and the color resist layer 42. Both the color resist layer 41 and the color resist layer 42 are disposed between the planarization layer 50 and the pixel electrode 30. In this case, the common electrode 80 may be disposed between the planarization layer 50 and the color resist layer 42. The color resist layer 41, the color resist layer 42, and the medium layer between the color resist layer 41 and the color resist layer 42 may work as an insulating layer between the pixel electrode 30 and the common electrode 80. In this manner, no additional insulating layer is needed between the pixel electrode 30 and the common electrode 80, simplifying the manufacturing process of the array substrate 100, lowering the cost of the array substrate 100, and facilitating the thinning of the display panel equipped with the array substrate 100. Additionally, under the premise of not considering the manufacturing process, an insulating layer may be disposed between the pixel electrode 30 and the at least two color resist layers 40, and/or between the at least two color resist layers 40 and the common electrode 80. When the insulating layer is disposed between the pixel electrode 30 and the at least two color resist layers 40, the insulating layer can protect the color resist layer 41. Accordingly, when processes like etching are performed on the film on the side of the insulating layer facing away from the base substrate 10, the color resist patterns in the color resist layer 41 are not damaged, thus the product yield is boosted and the production cost is lowered.

Figure 9:
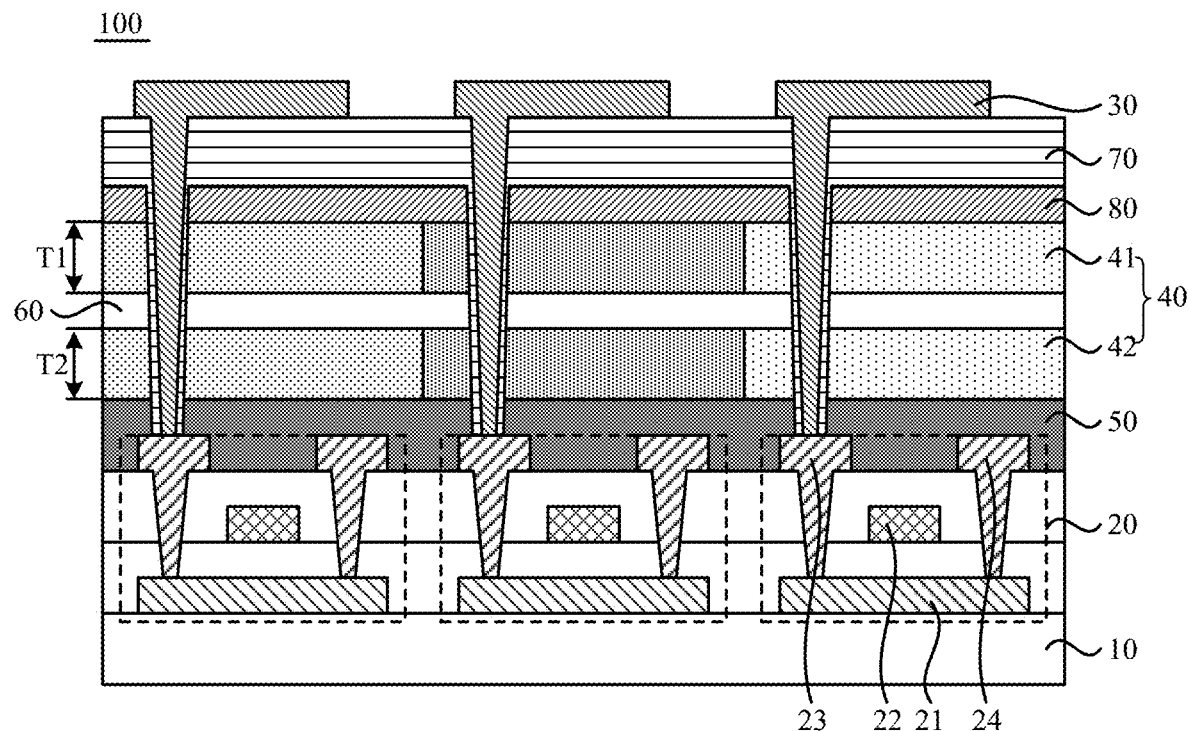
FIG. 9 is a diagram illustrating the layer structure of another array substrate according to an embodiment of the present application.

Exemplarily, FIG. 9 is a diagram illustrating the layer structure of another array substrate according to an embodiment of the present application. For the similarities between FIG. 9 and FIG. 8, refer to the preceding description of FIG. 8. Only the differences between FIG. 9 and FIG. 8 are exemplarily described here. As shown in FIG. 9, the common electrode 80 may be disposed between the color resist layer 41 and the pixel electrode 30. In this case, the insulating layer 70 needs to be disposed between the pixel electrode 30 and the common electrode 80 to insulate the pixel electrode 30 and the common electrode 80 from each other. Meanwhile, a corresponding medium layer may be disposed between the common electrode 80 and the color resist layer 41 to protect the color resist layer 41. Correspondingly, the medium layer can fill the puncturing position in the color resist layer 41 to form a relatively planar surface on the side of the medium layer facing away from the base substrate 10, thus enabling the common electrode 80 to be formed on a relatively planer surface and facilitating the film forming of the common electrode 80.

Figure 10:
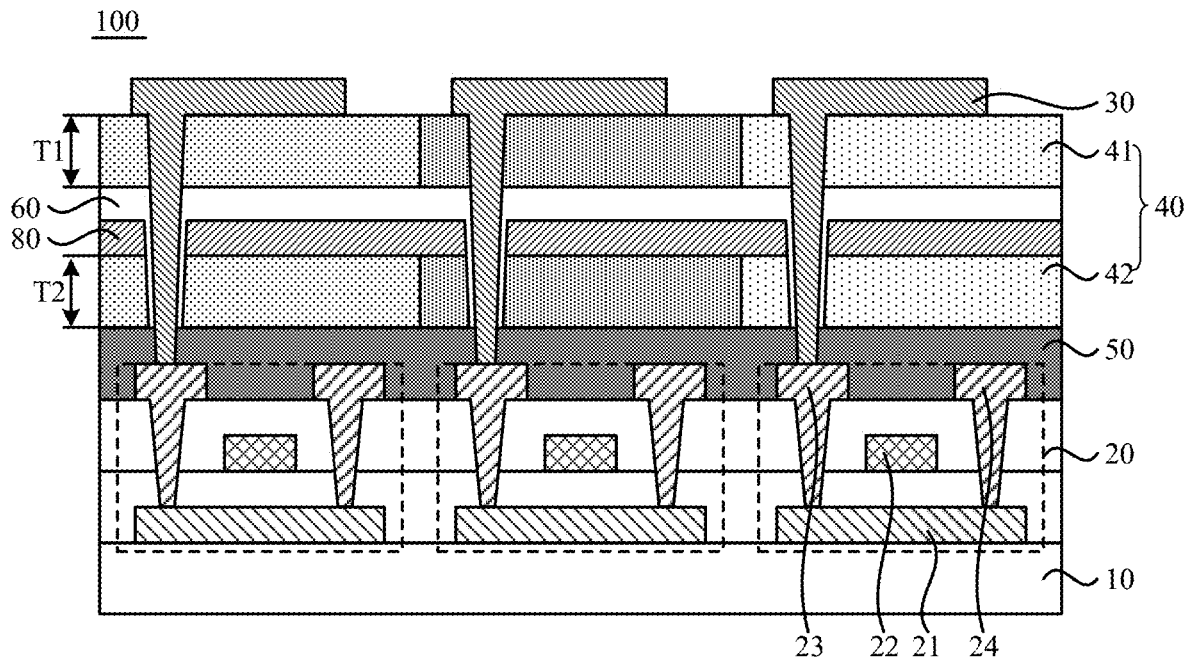
FIG. 10 is a diagram illustrating the layer structure of another array substrate according to an embodiment of the present application.

Exemplarily, FIG. 10 is a structural diagram illustrating the layer structure of another array substrate according to an embodiment of the present application. For the similarities between FIG. 10 and FIG. 8, refer to the preceding description of FIG. 8. Only the differences between FIG. 10 and FIG. 8 are exemplarily described here. As shown in FIG. 10, the common electrode 80 is disposed between the two adjacent color resist layers 41 and 42. The medium layer 60 disposed between the two color resist layers 41 and 42 may be disposed on the side of the common electrode 80 facing away from the base substrate 10. The medium layer 60 can protect the color resist patterns on the color resist layer 42 disposed on the side of the medium layer 60 facing the base substrate 10 from damage. Meanwhile, the medium layer 60 and the color resist layer 41 disposed between the common electrode 80 and the pixel electrode 30 can work as insulating layers between the common electrode 80 and the pixel electrode 30 to insulate the common electrode 80 and the pixel electrode 30 from each other. In this case, no additional insulating layer is needed between the common electrode 80 and the pixel electrode 30, simplifying the manufacturing process of the array substrate 100, lowering the cost of the array substrate 100, and facilitating the thinning of the display panel equipped with the array substrate 100. Correspondingly, the via is manufactured in the following steps to penetrate through layers between the pixel electrode 30 and the layer carrying the first electrode 23 of the TFT 20. Firstly, the planarization layer 50 and the color resist layer 42 are formed successively.

Secondly, the color resist layer 42 is punctured, with the planarization layer 50 not punctured temporarily. Thirdly, the common electrode 80 is formed on the side of the color resist layer 42 facing away from the base substrate 10 and punctured. Fourthly, the medium layer 60 is formed on the side of the common electrode layer 80 facing away from the base substrate 10. The medium layer 60 may fill the puncturing positions on the common electrode 80 and the color resist layer 42 to form a relatively planar surface on the side of the medium layer 60 facing away from the base substrate 10. Fifthly, the color resist layer 41 is formed on the side of the medium layer 60 facing away from the base substrate 10 and punctured. Lastly, the medium layer 60 and the planarization layer 50 are punctured simultaneously. In this manner, each of the color resist layers (41 and 42) is punctured separately. Therefore, each of the color resist layers (41 and 42) has a relatively small puncturing depth, and thus the puncturing difficulty on the color resist layers is reduced. Additionally, a corresponding insulating layer may be disposed between the pixel electrode 30 and the color resist layer 41 to protect the color resist 41 disposed between the insulating layer and the common electrode 80.

Figure 11:
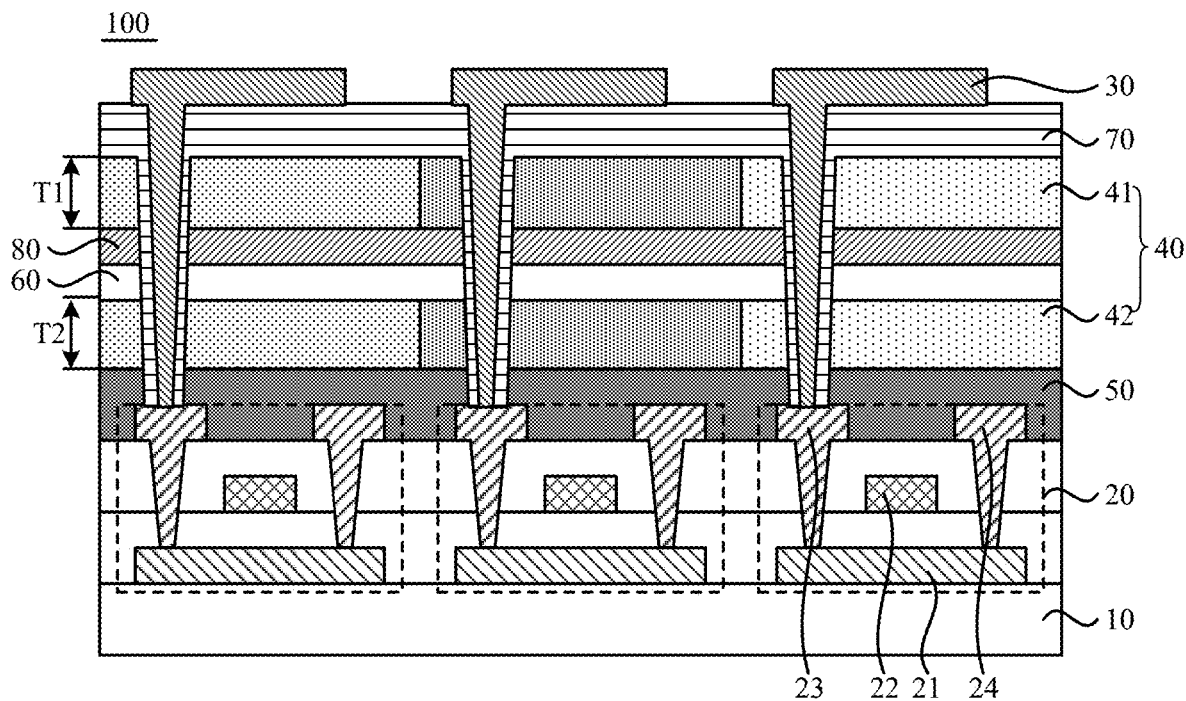
FIG. 11 is a diagram illustrating the layer structure of another array substrate according to an embodiment of the present application.

Exemplarily, FIG. 11 a diagram illustrating the layer structure of another array substrate according to an embodiment of the present application. For the similarities between FIG. 11 and FIG. 10, refer to the preceding description of FIG. 10. Only the differences between FIG. 11 and FIG. 10 are exemplarily described here. As shown in FIG. 11, the common electrode 80 and the medium layer 60 are disposed between the color resist layer 41 and the color resist layer 42. The common electrode 80 is disposed on the side of the medium layer 60 facing away from the base substrate 10. The insulating layer 70 is disposed between the pixel electrode 30 and the color resist layer 41. Correspondingly, in the manufacturing of the via penetrating through layers between the pixel electrode 30 and the layer carrying the first electrode 23 of the TFT 20, the planarization layer 50 and the color resist layer 42 may be formed firstly. Secondly, the color resist layer 42 is punctured at the corresponding position, with the puncturing depth equaling the thickness T2 of the color resist layer 42. Thirdly, the medium layer 60 is formed on the side of the color resist layer 42 facing away from the base substrate 10. The medium layer 60 may cover the color resist layer 42 and fill the puncturing position in the color resist layer 42 to form a relatively planar surface on the side of the medium layer 60 facing away from the base substrate 10. Fourthly, the common electrode 80 is formed on the side of the medium layer 60 facing away from the base substrate 10. In this manner, the common electrode 80 can be formed on a relatively planer surface, which facilitates the film forming of the common electrode 80. Fifthly, the common electrode 80, after being formed, may be patterned and/or punctured, with the medium layer 60 not punctured temporarily. Sixthly, the color resist layer 41 is formed on the side of the common electrode 80 facing away from the base substrate 10 and punctured separately. Seventhly, the medium layer 60 and the planarization 50 inside the via are punctured to expose the first electrode of the TFT 20. Lastly, the insulating layer 70 is formed on the side of the color resist 41 facing away from the base substrate 10 and punctured. At this point, the via is manufactured penetrating through the layers between the pixel electrode 30 and the layer carrying the first electrode 23 of the TFT 20. In one embodiment, when the insulating layer 70, the medium layer 60, and the planarization layer 50 may be punctured using the same process, the insulating layer 70, the medium layer 60, and the planarization layer 50 may be punctured simultaneously after the insulating layer 70 is formed. In this manner, each of the color resist layers (41 and 42) is punctured separately. Therefore, the via manufacturing difficulty is reduced, the product yield boosted, and the production cost reduced.

Figure 12:
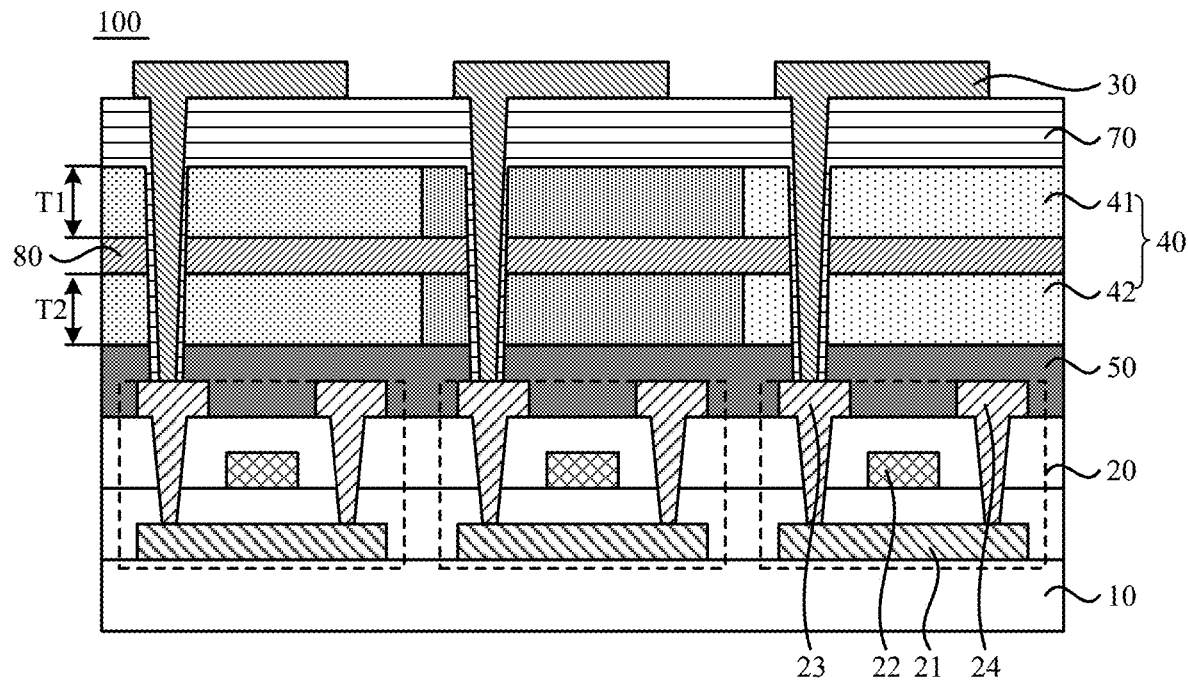
FIG. 12 is a diagram illustrating the layer structure of another array substrate according to an embodiment of the present application.

Exemplarily, FIG. 12 is a diagram illustrating the layer structure of another array substrate according to an embodiment of the present application. For the similarities between FIG. 12 and FIGS. 10 and 11, refer to the preceding description of FIGS. 10 and 11. Only the differences between FIG. 12 and FIG. 10 are exemplarily described here. As shown in FIG. 12, the common electrode 80 is disposed between the color resist layer 41 and the color resist layer 42. The insulating layer 70 is disposed between the color resist layer 41 and the pixel electrode 30. In this case, the common electrode 80 may work as a medium layer between the color resist layer 41 and the color resist layer 42. No additional medium layer is needed between the color resist layer 41 and the color resist layer 42. The insulating layer 70 disposed between the color resist layer 41 and the pixel electrode 30 may fill the puncturing positions in the color resist layer 41 and the layer carrying the common electrode 80 to protect the color resist patterns in the color resist layer 41. Additionally, the common electrode 80 is insulated from the connecting line electrically connecting the pixel electrode 30 and the first electrode 23 of the TFT 20. Accordingly, mutual interference is avoided between common voltage signals on the common electrode 80 and pixel voltage signals on the pixel electrode 30. In this case, after the color resist layer 42 is formed and punctured, the common electrode 80 of an entire-plane structure may be formed on the side of the color resist layer 42 facing away from the base substrate 10. Then the color resist layer 41 is formed on the side of the common electrode 80 facing away from the base substrate 10. With the color resist layer 41 punctured, the common electrode 80 is punctured so that the common electrode 80 protects the color resist layer 42 from damage. Meanwhile, the insulating layer 70 disposed on the side of the color resist layer 41 facing away from the base substrate 10 may fill the color resist layer 42, the common electrode 80, and the opening in the color resist layer 42. In this manner, the insulating layer disposed surrounding the openings on the color resist layer 41, the common electrode 80, and the color resist layer 42, on one hand, can protect the color resist layer 41 and the color resist layer 42, on the other hand, can insulate the common electrode 80 from the connecting line between the pixel electrode 30 and the first electrode 23 of the TFT 20. Accordingly, mutual interference is avoided between common voltage signals on the common electrode 80 and pixel voltage signals on the pixel electrode 30. Moreover, under the premise of not considering the manufacturing process, a corresponding medium layer may be disposed between the common electrode 80 and the color resist layer 41, and/or between the common electrode 80 and the color resist layer 42.

In one embodiment, the at least two color resist layers include at least one first color resist layer and at least one second color resist layer; and the at least one first color resist layer is disposed between the planarization layer and the pixel electrode. In this case, the common electrode may be disposed between the planarization layer and the at least one first color resist layer. In one embodiment, the common electrode is disposed between the at least one first color resist layer and the pixel electrode. In one embodiment, the common electrode is disposed between two adjacent first color resist layers.

Figure 13:
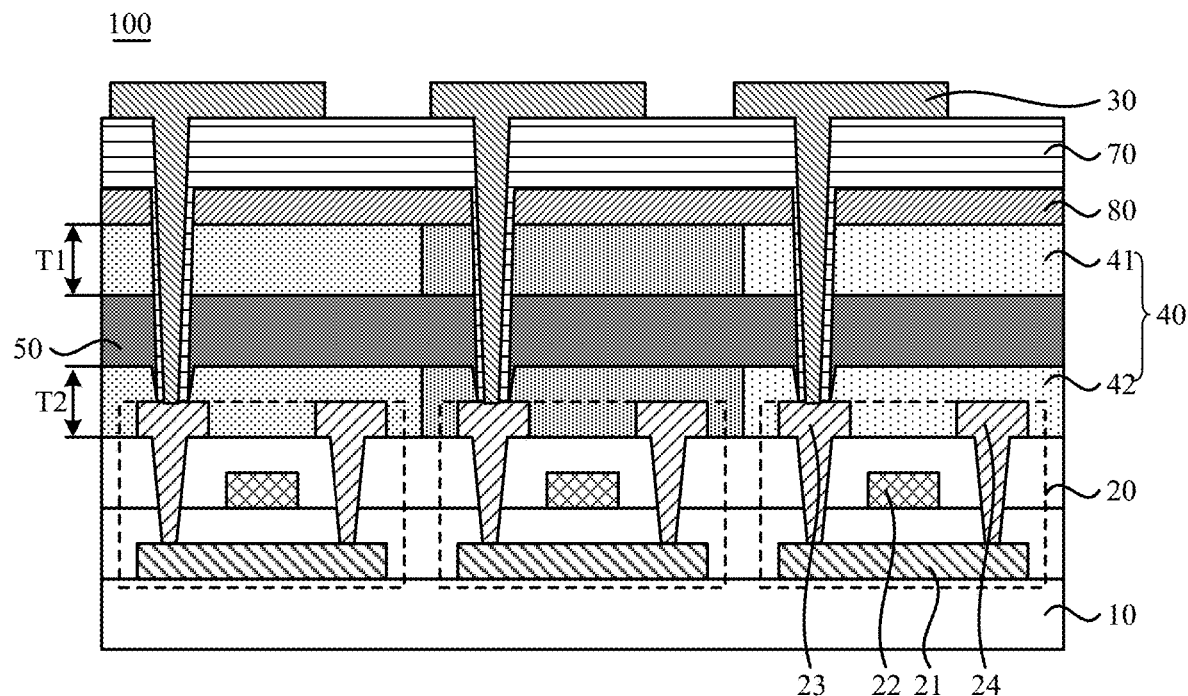
FIG. 13 is a diagram illustrating the layer structure of another array substrate according to an embodiment of the present application.

Exemplarily, FIG. 13 is a diagram illustrating the layer structure of another array substrate according to an embodiment of the present application. As shown in FIG. 13, the at least two color resist layers 40 include one first color resist layer 41 and one second color resist layer 42. The planarization layer 50 is disposed between the first color resist layer 41 and the second color resist layer 42. The common electrode 80 is disposed between the first color resist layer 41 and the pixel electrode 30. In this case, the insulating layer 70 is disposed between common electrode 80 and the pixel electrode 30 to avoid mutual interference between common voltage signals on the common electrode 80 and pixel voltage signals on the pixel electrode 30. Meanwhile, in the puncturing for the via penetrating through layers between the pixel electrode 30 and the layer carrying the first electrode 23 of the TFT 20, the first color resist layer 41, the second color resist layer 42 and the layer carrying the common electrode 80 may be punctured separately. Afterward, the insulating layer 70 is disposed on the side of the common electrode 80 facing away from the base substrate 10 and at the puncturing position. In this manner, under the premise that the common electrode 80 and the pixel electrode 30 are insulated from each other, the via manufacturing difficulty is reduced, and the damage to the color resist patterns in each of the color resist layers (41 and 42) caused by over-etching is avoided. Accordingly, the productivity and the product yield are boosted, the production cost reduced, thus the cost of the display panel equipped with the array substrate 100 lowered and the display effect of the display panel enhanced.

Figure 14:
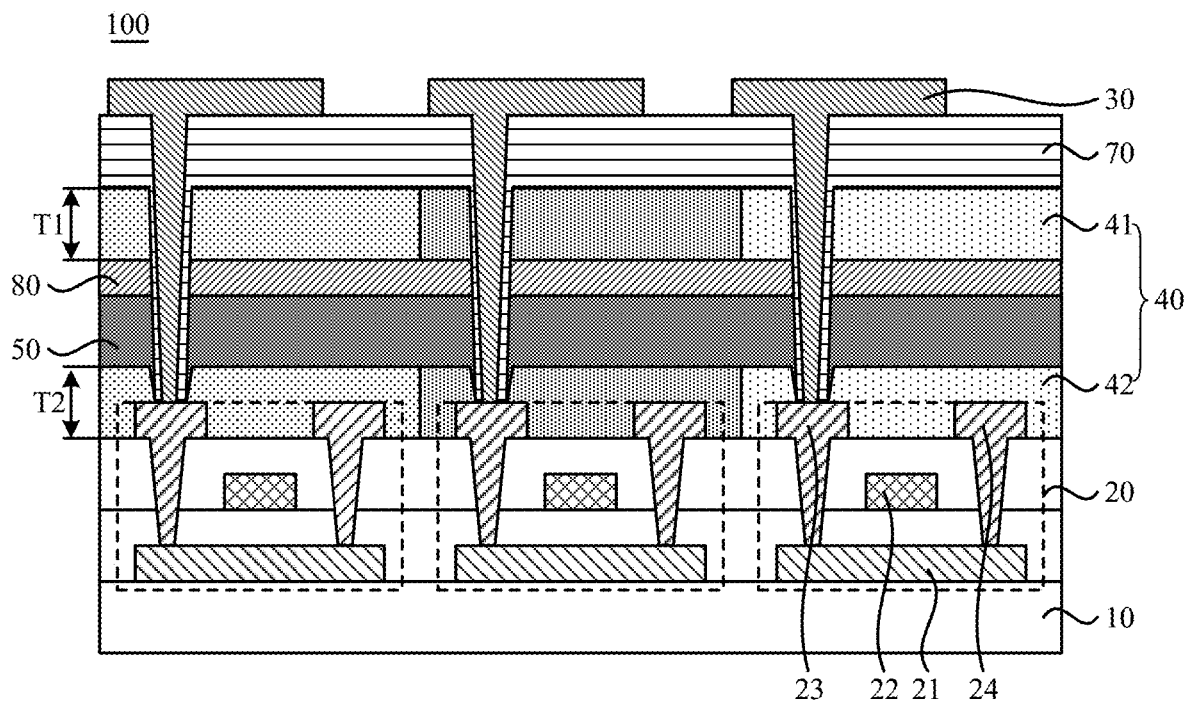
FIG. 14 is a diagram illustrating the layer structure of another array substrate according to an embodiment of the present application.

Exemplarily, FIG. 14 is a diagram illustrating the layer structure of another array substrate according to an embodiment of the present application. For the similarities between FIG. 14 and FIG. 13, refer to the preceding description of FIG. 13. Only the differences between FIG. 14 and FIG. 13 are exemplarily described here. As shown in FIG. 14, the common electrode 80 is disposed between the first color resist layer 41 and the planarization layer 50. The insulating layer 70 is disposed between the first color resist layer 41 and the pixel electrode 30. The insulating layer 70 can protect the first color resist layer 41. Accordingly, when etching is implemented on the functional layer on the side of the insulating layer 70 facing away from the first color resist layer 41, the color resist patterns in the first color resist layer 41 are not damaged. In this case, the planarization layer 50 and the common electrode 80 may work jointly as a medium layer between the first color resist layer 41 and the second color resist layer 42. No additional medium layer is needed between the first color resist layer 41 and the second color resist layer 42, simplifying the manufacturing process of the array substrate and lowering the production cost. Additionally, after the first color resist layer 41, the layer carrying the common electrode 80, the planarization layer 50, and the second color resist layer 42 are punctured, the insulating layer 70 is formed to fill the puncturing positions. In this manner, the pixel electrode 30 and the common electrode 80 can be insulated from each other in the manufacturing of the via penetrating through the insulating layer 70, the first color resist layer 41, the layer carrying the common electrode 80, the planarization layer 50, and the second color resist layer 42. Accordingly, mutual interference is avoided between common voltage signals on the common electrode 80 and pixel voltage signals on the pixel electrode 30.

Additionally, under the premise of not considering the manufacturing process, an additional medium layer may be disposed between the first color resist layer 41 and the second color resist layer 42. In this case, the common electrode 80 may be disposed on the side of the medium layer facing away from the base substrate 10, or on the side of the medium layer facing the base substrate 10.

Figure 15:
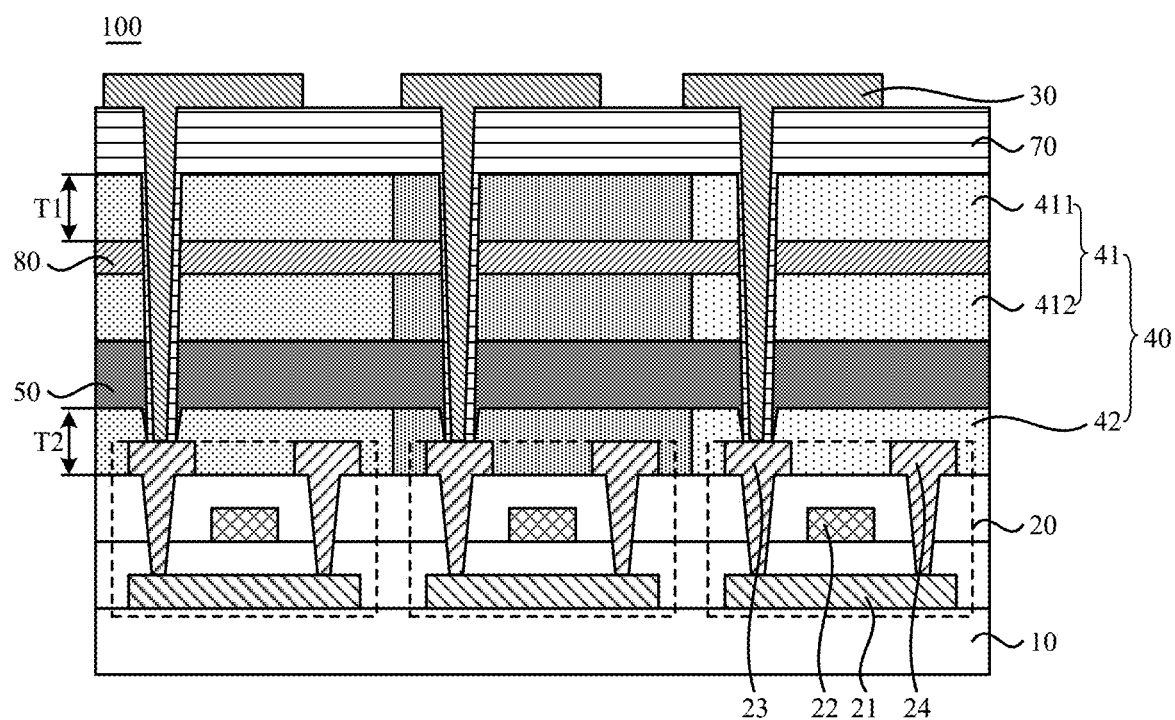
FIG. 15 is a diagram illustrating the layer structure of another array substrate according to an embodiment of the present application.

Exemplarily, FIG. 15 is a diagram illustrating the layer structure of another array substrate according to an embodiment of the present application. For the similarities between FIG. 15 and FIG. 14, refer to the preceding description of FIG. 14. Only the differences between FIG. 15 and FIG. 14 are exemplarily described here. As shown in FIG. 15, the at least two color resist layers 40 in the array substrate 100 include two first color resist layers 41 (411 and 412) and one second color resist layer 42. The planarization layer 50 is disposed between a first color resist layer 412 and the second color resist layer 42. The common electrode 80 is disposed between the two first color resist layers 411 and 412. The common electrode 80 may work as a medium layer between the two first color resist layers 411 and 412. In this manner, no additional medium layer is needed between the two adjacent first color resist layers 411 and 412. Correspondingly, the second color resist layer 42 is formed and punctured firstly. Secondly, the planarization layer 50 and the first color resist layer 412 are formed successively. Thirdly, the first color resist layer 412 is punctured. Fourthly, the common electrode 80 is formed and the first color resist layer 411 is formed on the side of the common electrode 80 facing away from the base substrate 10. The common electrode 80 may work as a medium layer between the first color resist layer 411 and the first color resist layer 412 so that the first color resist layer 411 and the first color resist layer 412 are insulated from each other. Fifthly, the color resist layer 411 is punctured to expose the common electrode 80. Lastly, the common electrode 80 and the planarization layer 50 inside the via are punctured successively. In this manner, the first color resist layer 411, the first color resist layer 412, and the second color resist layer 42 are punctured separately. Therefore, the puncturing difficulty in the color resist layers is reduced, the product yield boosted, and the production cost reduced. Moreover, under the premise of not considering the manufacturing process, a corresponding medium layer may be disposed between the common electrode 80 and the first color resist layer 411, and/or between the common electrode 80 and the first color resist layer 412.

It is to be noted that FIGS. 7 to 15 are only exemplary drawings in an embodiment of the present application and exemplarily illustrate the layer structure among the common electrode 80, the planarization layer 50, and the at least two color resist layers 40. For ease of description, in an embodiment of the present application are described exemplarily hereinafter with an example in which the common electrode is disposed between the at least two color resist layers and the pixel electrode.

In one embodiment, a first overlapping conductive layer is disposed on the side of the planarization layer facing away from the base substrate. The first overlapping conductive layer includes a first overlapping structure. The via penetrating the layers between the pixel electrode and the first electrode of the TFT may include a first via and a second via. The pixel electrode may be electrically connected to the first overlapping structure of the first overlapping conductive layer through the first via. The first overlapping structure may be electrically connected to the first electrode of the TFT through the second via. The material used for manufacturing the first overlapping conductive layer may be a metal material or other conductive materials.

Figure 16:
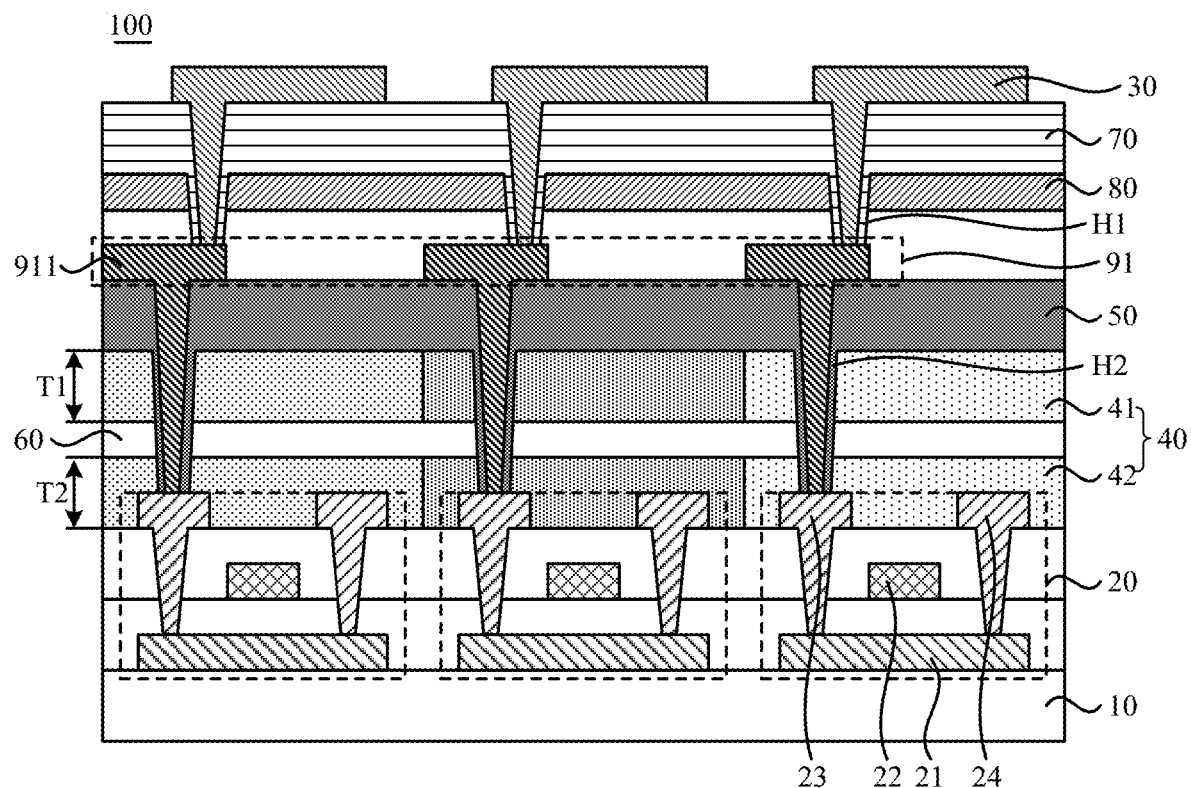
FIG. 16 is a diagram illustrating the layer structure of another array substrate according to an embodiment of the present application.

Exemplarily, FIG. 16 is a diagram illustrating the layer structure of another array substrate according to an embodiment of the present application. As shown in FIG. 16, the planarization layer 60 is disposed between the at least two color resist layers 40 and the pixel electrode 30. In this case, a first overlapping conductive layer 91 is disposed between the planarization layer 50 and the pixel electrode 30. With this arrangement, the pixel electrode 30 may be electrically connected to a first overlapping structure 911 of the first overlapping conductive layer 91 through a first via H1; the first overlapping structure 911 is electrically connected to the first electrode 23 of the TFT 20 through a second via H2. The first via H1 may penetrate through layers between the first overlapping conductive layer 91 and the pixel electrode 30. The second via H2 may penetrate through layers between the first overlapping conductive layer 91 and the TFT. With this arrangement, the first overlapping conductive layer 91 is disposed on the side of the planarization layer 50 facing away from the base substrate 10, as well as electrically connected to the pixel electrode 30 and the first electrode 23 of the TFT 20 successively through the first overlapping structure 911 of the first overlapping conductive layer 91. In this manner, the first via H1 and the second via H2 both have relatively small depth. Accordingly, the via manufacturing difficulty is further reduced, thus the productivity and the product yield of the array substrate boosted, and the production cost of the array substrate lowered.

Figure 17:
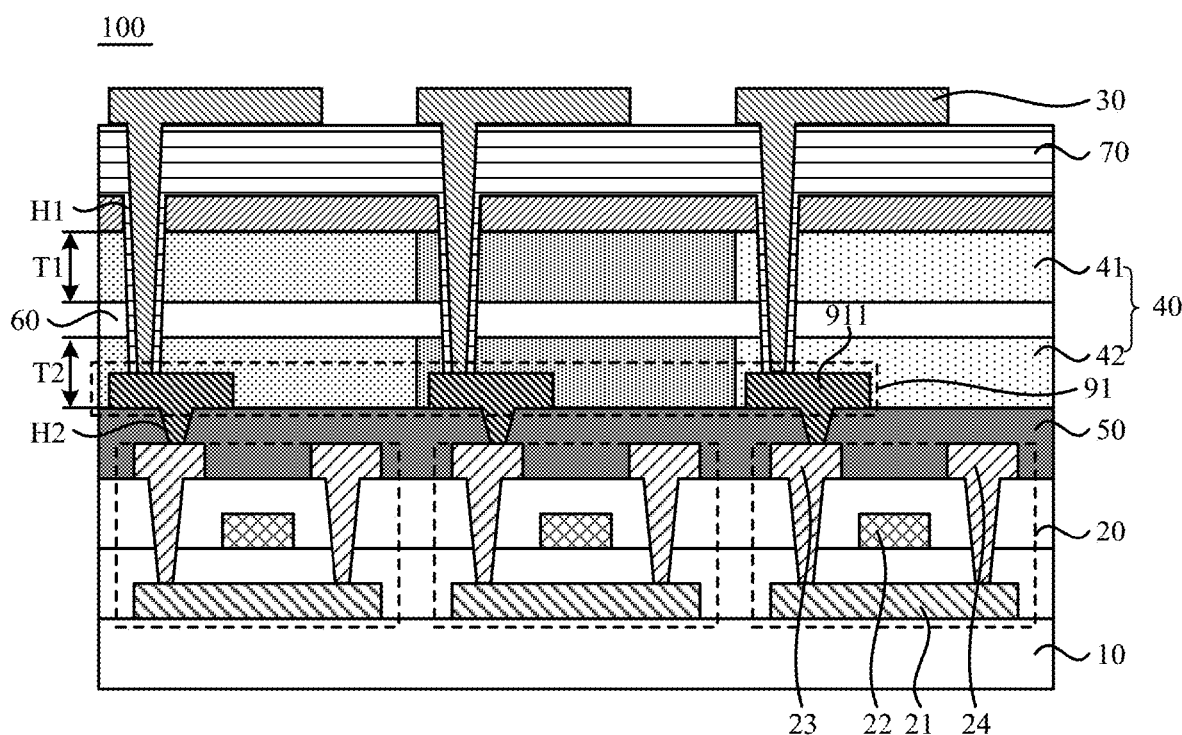
FIG. 17 is a diagram illustrating the layer structure of another array substrate according to an embodiment of the present application.

Exemplarily, FIG. 17 is a diagram illustrating the layer structure of another array substrate according to an embodiment of the present application. For the similarities between FIG. 17 and FIG. 16, refer to the preceding description of FIG. 16. Only the differences between FIG. 17 and FIG. 16 are exemplarily described here. As shown in FIG. 17, when the planarization layer 50 is disposed between the at least two color resist layers 40 and the TFT 20, the first overlapping conductive layer 91 may be disposed between the planarization layer 50 and the at least two color resist layers 40. In this manner, the first via H1 and the second via H2 may also have a relatively small depth, and thus the via manufacturing difficulty is reduced.

Figure 18:
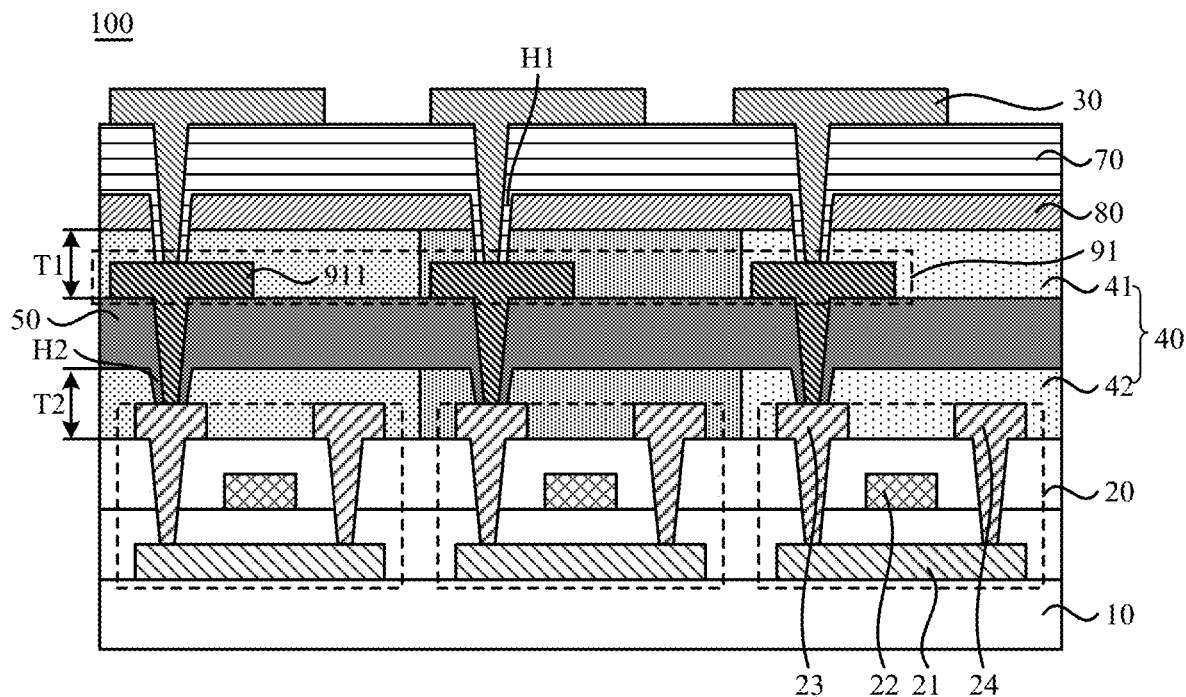
FIG. 18 is a diagram illustrating the layer structure of another array substrate according to an embodiment of the present application.

Exemplarily, FIG. 18 is a diagram illustrating the layer structure of another array substrate according to an embodiment of the present application. For the similarities between FIG. 18 and FIG. 16, refer to the preceding description of FIG. 16. Only the differences between FIG. 18 and FIG. 16 are exemplarily described here. As shown in FIG. 18, the at least two color resist layers 40 include at least one first color resist layer 41 and at least one second color resist layer 42. The planarization layer 50 is disposed between the adjacent first color resist layer 41 and the second color resist layer 42. With this arrangement, the first overlapping conductive layer 91 may be disposed between the planarization layer 50 and the first color resist layer 41. Accordingly, the first via H1 and the second via H2 may also have a small depth, and thus the via manufacturing difficulty is reduced.

It is to be noted that FIGS. 16 to 18 are only exemplary drawings in an embodiment of the present application, where the first overlapping conductive layer 91 is disposed on the surface of the planarization layer 50. In an embodiment of the present application, a corresponding functional layer may be disposed between the planarization layer 50 and the first overlapping conductive layer under the premising of reducing the via manufacturing difficulty.

In one embodiment, the first overlapping conductive layer disposed between the planarization layer and the layer carrying the pixel electrode may further include a touch line. In this case, the array substrate further includes a touch electrode. The touch line in the first overlapping conductive layer is electrically connected to the touch electrode to implement the transmission of touch signals. In this manner, the first overlapping structure and the touch line, of the first overlapping conductive layer, may be manufactured using the same material in the same process, thus simplifying the process steps for manufacturing the array substrate, enhancing the productivity, and reducing the production cost.

Exemplarily, the common electrode in the array substrate may be re-used as the touch electrode. In one embodiment, when the touch electrode is a self-capacitance touch electrode, the common electrode may be a block structure. In this case, common voltage signals are applied to the common electrode in the display phase so that the common electrode and the pixel electrode form an in-plane field; in the touch phase, corresponding touch detection signals may be received through the common electrode. When the touch electrode is a mutual-capacitance touch electrode, the common electrode may be re-used as a touch drive electrode among the mutual-capacitance touch electrode. In this case, the common electrode may be a bar structure, block structure, or entire-plane structure.

In one embodiment, the array substrate may further include at least one second overlapping conductive layer. Each second overlapping conductive layer includes a second overlapping structure. The at least one second overlapping conductive layer is disposed between two adjacent color resist layers. Second overlapping structures of different second overlapping conductive layers are electrically connected in sequence. When the at least two color resist layers are disposed between the planarization layer and the pixel electrode, the first via penetrating through layers between the first overlapping conductive layer and the pixel electrode may include a first sub-via and a second sub-via. The pixel electrode is electrically connected to the second overlapping structure of a second overlapping conductive layer through the first sub-via. The second overlapping structure is electrically connected to the first overlapping structure of the first overlapping conductive layer through the second sub-via. The material used for manufacturing the at least one second overlapping conductive layer may be a metal material or other conductive materials.

Figure 19:
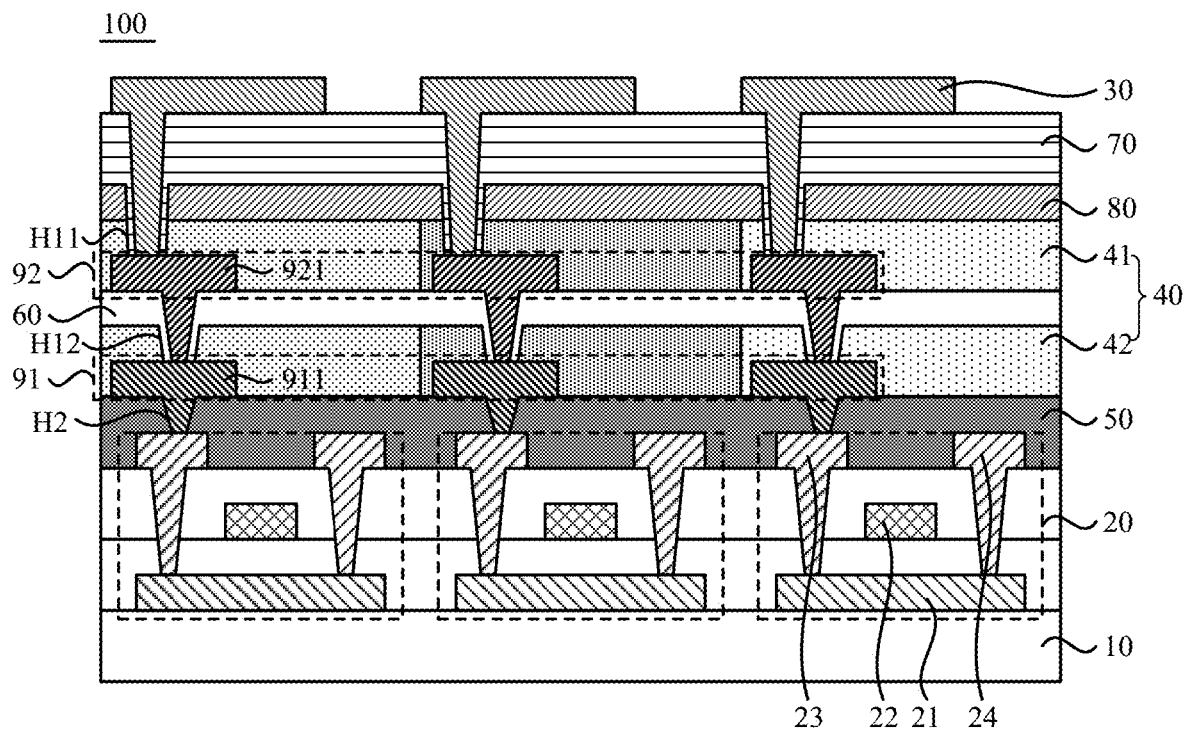
FIG. 19 is a diagram illustrating the layer structure of another array substrate according to an embodiment of the present application.

Exemplarily, FIG. 19 is a diagram illustrating the layer structure of another array substrate according to an embodiment of the present application. As shown in FIG. 19, the at least two color resist layers 40 may include two color resist layers 41 and 42. The at least two color resist layers 40 are disposed between the planarization layer 50 and the pixel electrode. The first overlapping conductive layer is disposed between the planarization layer 50 and the at least two color resist layers 40. A second overlapping conductive layer 92 is disposed between the two adjacent color resist layers 41 and 42. In this case, the pixel electrode 30 is electrically connected to a second overlapping structure 921 of the second overlapping conductive layer 92 through a first sub-via H11. The second overlapping structure 921 is electrically connected to the first overlapping structure 911 on the first overlapping conductive layer 91 through a second sub-via H12. The first overlapping structure 911 is electrically connected to the first electrode 23 of the TFT 20 through the second via H2. With this arrangement, the first sub-via H11 penetrating through layers between the pixel electrode and the second overlapping conductive layer 92 is manufactured separately from the second sub-via H12 penetrating through layers between the second overlapping conductive layer 92 and the first overlapping conductive layer 91. In this manner, both the first sub-via H11 and the second sub-via H12 have a relatively small depth. Accordingly, the via manufacturing difficulty is further reduced, the productivity and the product yield of the array substrate 100 boosted, and the production cost of the array substrate 100 lowered.

Figure 20:
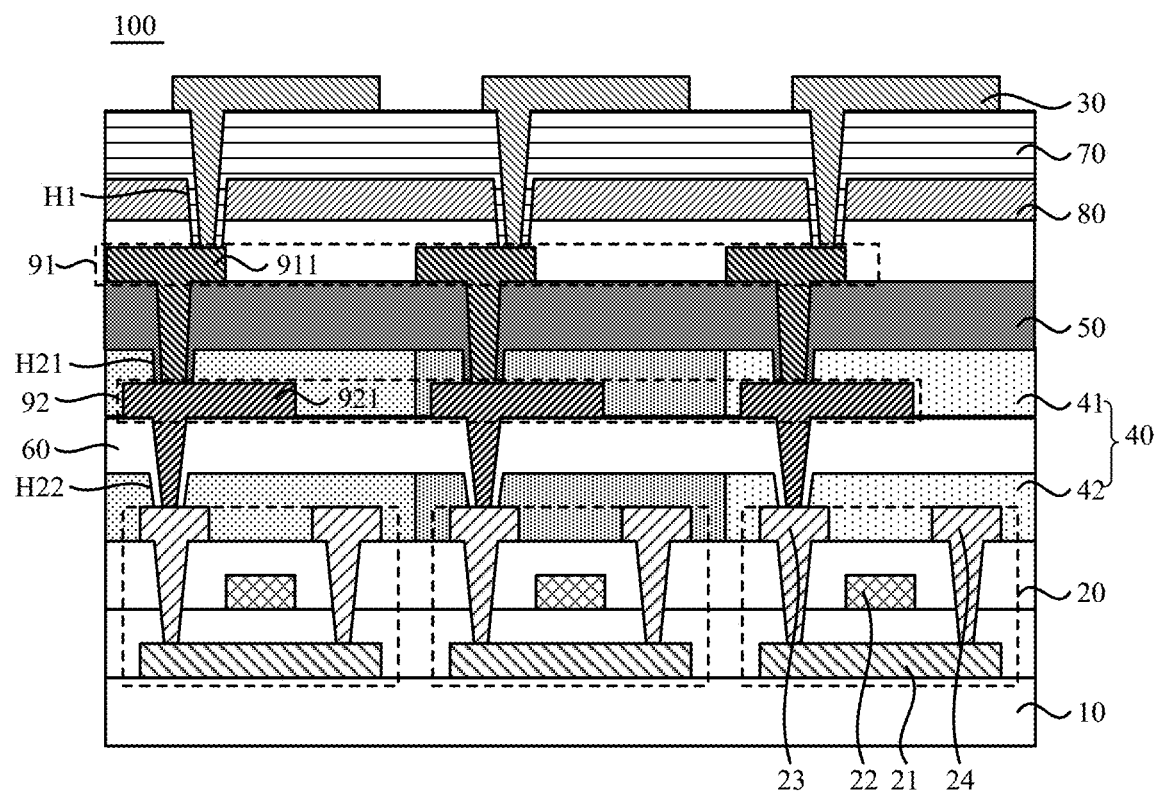
FIG. 20 is a diagram illustrating the layer structure of another array substrate according to an embodiment of the present application.

Exemplarily, FIG. 20 is a diagram illustrating the layer structure of another array substrate according to an embodiment of the present application. For the similarities between FIG. 20 and FIG. 19, refer to the preceding description of FIG. 19. Only the differences between FIG. 20 and FIG. 19 are exemplarily described here. As shown in FIG. 20, the planarization layer 50 is disposed between the at least two color resist layers 40 and the pixel electrode 30. The first overlapping conductive layer 91 is disposed between the planarization layer 50 and the pixel electrode 30. The second overlapping conductive layer 92 is disposed between the two adjacent color resist layers 41 and 42. In this case, the pixel electrode 30 may be electrically connected to the first overlapping structure 911 of the first overlapping conductive layer 91 through the first via H1. The first overlapping structure 911 may be electrically connected to the second overlapping structure 921 of the second overlapping conductive layer 92 through a third sub-via H21. The second overlapping structure may be electrically connected to the first electrode 23 of the TFT 20 through a fourth sub-via H22. With this arrangement, the third sub-via H21 penetrating through layers between the first overlapping conductive layer 91 and the second overlapping conductive layer 92 is manufactured separately from the fourth sub-via H22 penetrating through layers between the second overlapping conductive layer 92 and the TFT 20. In this manner, both the third sub-via H21 and the fourth sub-via H22 have a relatively small depth. Accordingly, the via manufacturing difficulty is further reduced, the productivity and the product yield of the array substrate 100 boosted, and the production cost of the array substrate 100 lowered.

It is to be noted that FIGS. 19 and 20 are only exemplary drawings in an embodiment of the present application. In FIGS. 19 and 20, the at least two color resist layers 40 include two color resist layers 41 and 42. The second overlapping conductive layer 92 is disposed between the two color resist layers 41 and 42. In the embodiment of the present application, the at least two color resist layers may include two layers, three layers, or more layers. Since a second overlapping conductive layer may be disposed between any adjacent color resist layers, the array substrate in an embodiment of the present application may include one, two, or more second overlapping conductive layers. Additionally, a corresponding insulating structure may be disposed between adjacent functional layers to avoid mutual interference between the functional layers.

In one embodiment, when the planarization layer is disposed between two adjacent color resist layers, the at least two color resist layers may include at least two first color resist layers and at least one second color resist layer. That is, the at least two first color resist layers are disposed between the planarization layer and the pixel electrode, and the at least one second color resist layer is disposed between the planarization layer and the TFT. In this case, the array substrate may include at least one third overlapping conductive layer. The at least one third overlapping conductive layer is disposed between two adjacent first color resist layers. Each third overlapping conductive layer may include a third overlapping structure. Third overlapping structures of different third overlapping conductive layers are electrically connected in sequence. The first via penetrating through layers between the pixel electrode and the first overlapping structure may include the first sub-via and the second sub-via. The pixel electrode is electrically connected to the third overlapping structure through the first sub-via. The third overlapping structure is electrically connected to the first overlapping structure through the second sub-via. The material used for manufacturing the at least one third overlapping conductive layer may be a metal material or other conductive materials.

Figure 21:
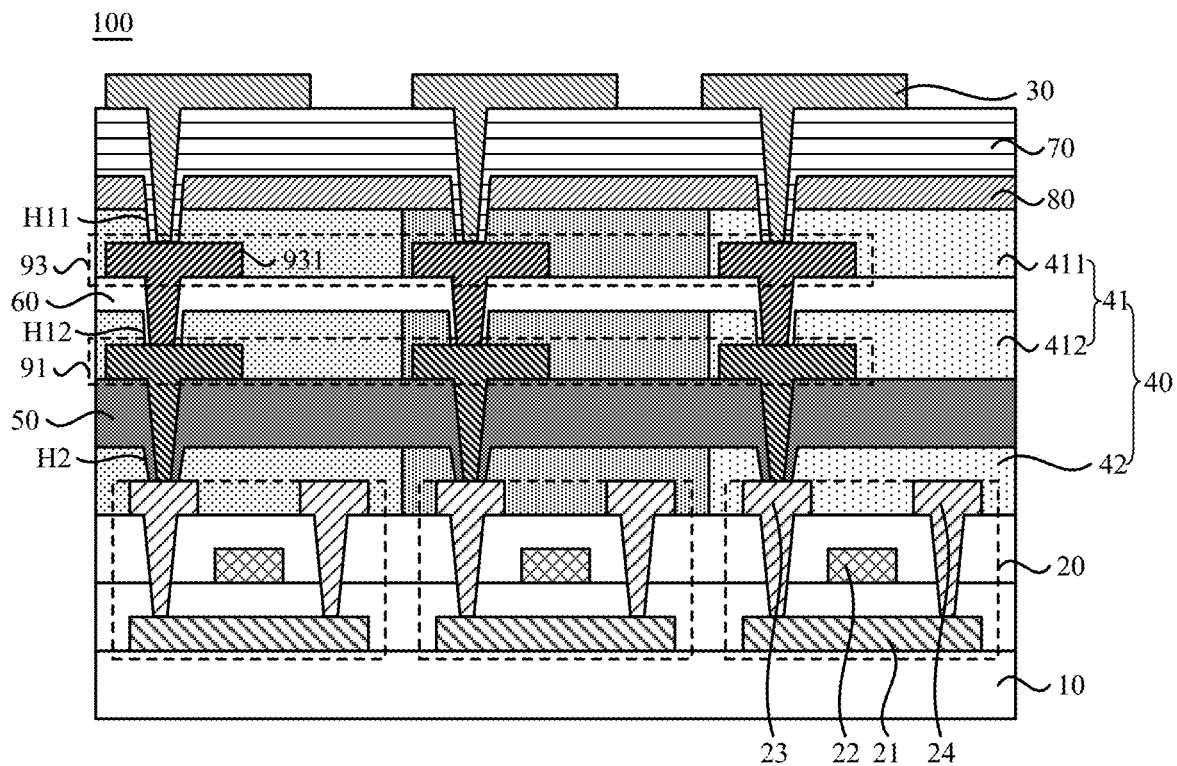
FIG. 21 is a diagram illustrating the layer structure of another array substrate according to an embodiment of the present application.

Exemplarily, FIG. 21 is a diagram illustrating the layer structure of another array substrate according to an embodiment of the present application. As shown in FIG. 21, the at least two color resist layers 40 in the array substrate 100 include two first color resist layers 41 (411 and 412) and one second color resist layer 42. The planarization layer 50 is disposed between the adjacent first color resist layer 412 and the second color resist layer 42. A third overlapping conductive layer 93 is disposed between the adjacent first color resist layers 411 and 412. The first overlapping conductive layer 91 is disposed between the first color resist layer 412 and the planarization layer 50. In this case, the pixel electrode 30 may be electrically connected to a third overlapping structure 931 of the third overlapping conductive layer 93 through the first sub-via H11. The third overlapping structure 931 may be electrically connected to the first overlapping structure 911 of the first overlapping conductive layer 91 through the second sub-via H12. The first overlapping structure 911 is electrically connected to the first electrode 23 of the TFT 20 through the second via H2. In this manner, both the first sub-via H11 and the second sub-via H12 have a relatively small depth. Accordingly, the via manufacturing difficulty is further reduced, the productivity and the product yield of the array substrate boosted, and the production cost of the array substrate lowered.

It is to be noted that FIG. 21 is only an exemplary drawing in an embodiment of the present application. In FIG. 21, the at least two color resist layers 40 include two first color resist layers 41 and one second color resist layer 42. In an embodiment of the present application, the at least two color resist layers may include at least two first color resist layers and at least one second color resist layer. That is, the at least two first color resist layers may include two layers, three layers, or more layers; the at least one second color resist layer may include one layer, two layers, or more layers. The number of first color resist layers may be the same as or different from the number of second color resist layers.

In one embodiment, when the planarization layer is disposed between two adjacent color resist layers, the at least two color resist layers may include at least one first color resist layer and at least two second color resist layers. That is, the at least one first color resist layer is disposed between the planarization layer and the pixel electrode, and the at least two second color resist layers are disposed between the planarization layer and the TFT. In this case, the array substrate may further include at least one fourth overlapping conductive layer. The at least one fourth overlapping conductive layer is disposed between two adjacent second color resist layers. Each fourth overlapping conductive layer includes a fourth overlapping structure. Fourth overlapping structures of different fourth overlapping conductive layers are electrically connected in sequence. The second via penetrating through layers between the first overlapping structure and the layer carrying the first electrode of the TFT includes the third sub-via and the fourth sub-via. The first overlapping structure is electrically connected to the fourth overlapping structure of a fourth overlapping conductive layer through the third sub-via. The fourth overlapping structure is electrically connected to the first electrode of the TFT through the fourth sub-via. The material used for manufacturing the at least one fourth overlapping conductive layer may be a metal material or other conductive materials.

Figure 22:
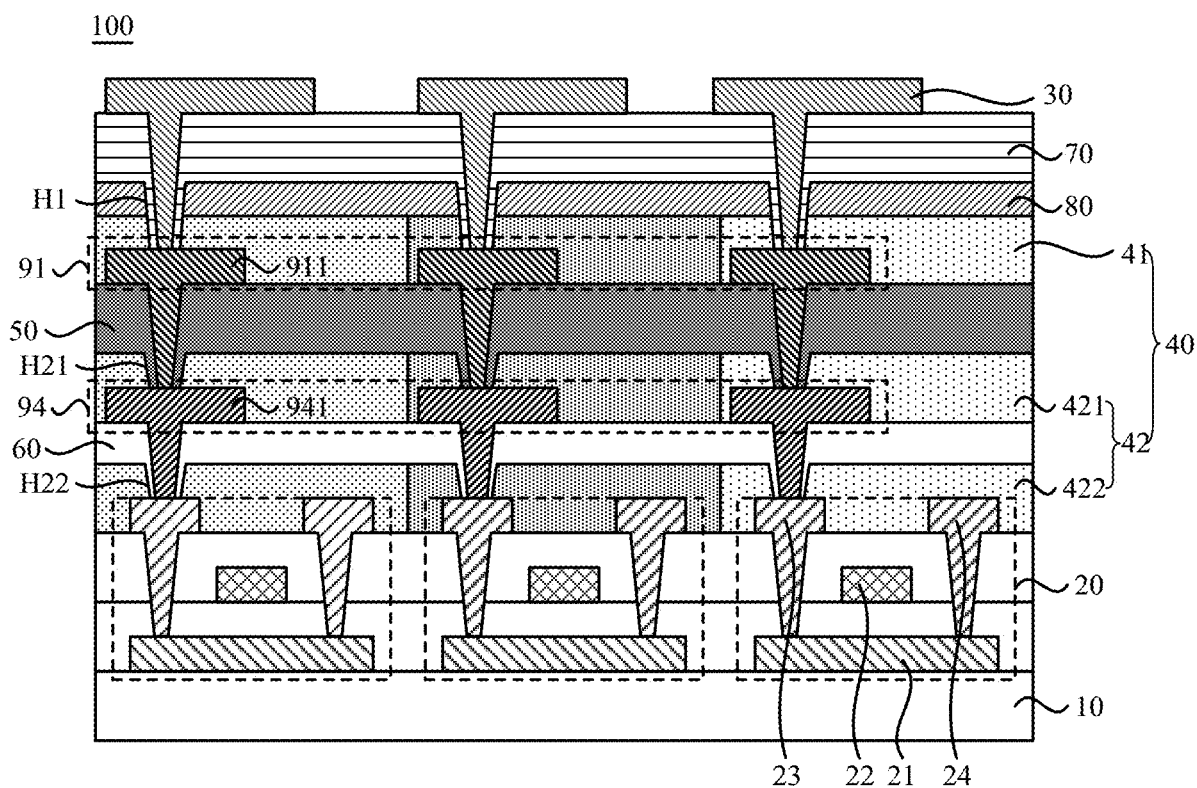
FIG. 22 is a diagram illustrating the layer structure of another array substrate according to an embodiment of the present application.

Exemplarily, FIG. 22 is a diagram illustrating the layer structure of another array substrate according to an embodiment of the present application. As shown in FIG. 22, the at least two color resist layers 40 in the array substrate 100 include one first color resist layer 41 and two second color resist layers 42 (421 and 422). The planarization layer 50 is disposed between the first color resist layer 41 and a second color resist layer 421. A fourth overlapping conductive layer 94 is disposed between the adjacent second color resist layers 421 and 422. The first overlapping conductive layer 91 is disposed between the first color resist layer 41 and the planarization layer 50. In this case, the pixel electrode 30 may be electrically connected to the first overlapping structure 911 of the first overlapping conductive layer 91 through the first sub-via H11. The first overlapping structure 911 may be electrically connected to a fourth overlapping structure 941 of the fourth overlapping conductive layer 94 through the third sub-via H21. The fourth overlapping structure 941 is electrically connected to the first electrode 23 of the TFT 20 through the fourth via H22. In this manner, both the third sub-via H21 and the fourth sub-via H22 have a relatively small depth. Accordingly, the via manufacturing difficulty is further reduced, the productivity and the product yield of the array substrate boosted, and the production cost of the array substrate lowered.

It is to be noted that FIG. 22 is only an exemplary drawing in an embodiment of the present application. In FIG. 22, the at least two color resist layers 40 include one first color resist layer 41 and two second color resist layers 42. In an embodiment of the present application, the at least two color resist layers may include at least one first color resist layer and at least two second color resist layers. That is, the at least one first color resist layer may include one layer, two layers, or more layers; the at least two second color resist layers may include two layers, three layers, or more layers. The number of first color resist layers may be the same as or different from the number of second color resist layer.

In one embodiment, when the planarization layer is disposed between two adjacent color resist layers, the at least two color resist layers may include at least two first color resist layers and at least two second color resist layers. That is, at least two first color resist layers are disposed between the planarization layer and the pixel electrode, and at least two second color resist layers are disposed between the planarization layer and the TFT. In this case, the array substrate may further include at least one third overlapping conductive layer and at least one fourth overlapping conductive layer. The at least one third overlapping conductive layer is disposed between two adjacent first color resist layers. Each third overlapping conductive layer includes a third overlapping structure. Third overlapping structures of different third overlapping conductive layers are electrically connected in sequence. The at least one fourth overlapping conductive layer is disposed between two adjacent second color resist layers. Each fourth overlapping conductive layer includes a fourth overlapping structure. Fourth overlapping structures of the different fourth overlapping conductive layers are electrically connected in sequence. The first via penetrating through layers between the pixel electrode and the first overlapping conductive layer may include the first sub-via and the second sub-via. The second via penetrating through layers between the first overlapping conductive layer and the layer carrying the first electrode of the TFT may include the third sub-via and the fourth sub-via. Accordingly, the pixel electrode is electrically connected to the third overlapping structure of a third overlapping conductive layer through the first sub-via; the third overlapping structure is electrically connected to the first overlapping structure of the first overlapping conductive layer through the second sub-via; the first overlapping structure is electrically connected to the fourth overlapping structure of a fourth overlapping conductive layer through the third sub-via; and the fourth overlapping structure is electrically connected to the first electrode of the TFT through the fourth sub-via. The material used for manufacturing the at least one third overlapping conductive layer may be a metal material or other conductive materials. The material used for manufacturing the at least one fourth overlapping conductive layer may also be a metal material or other conductive materials.

Figure 23:
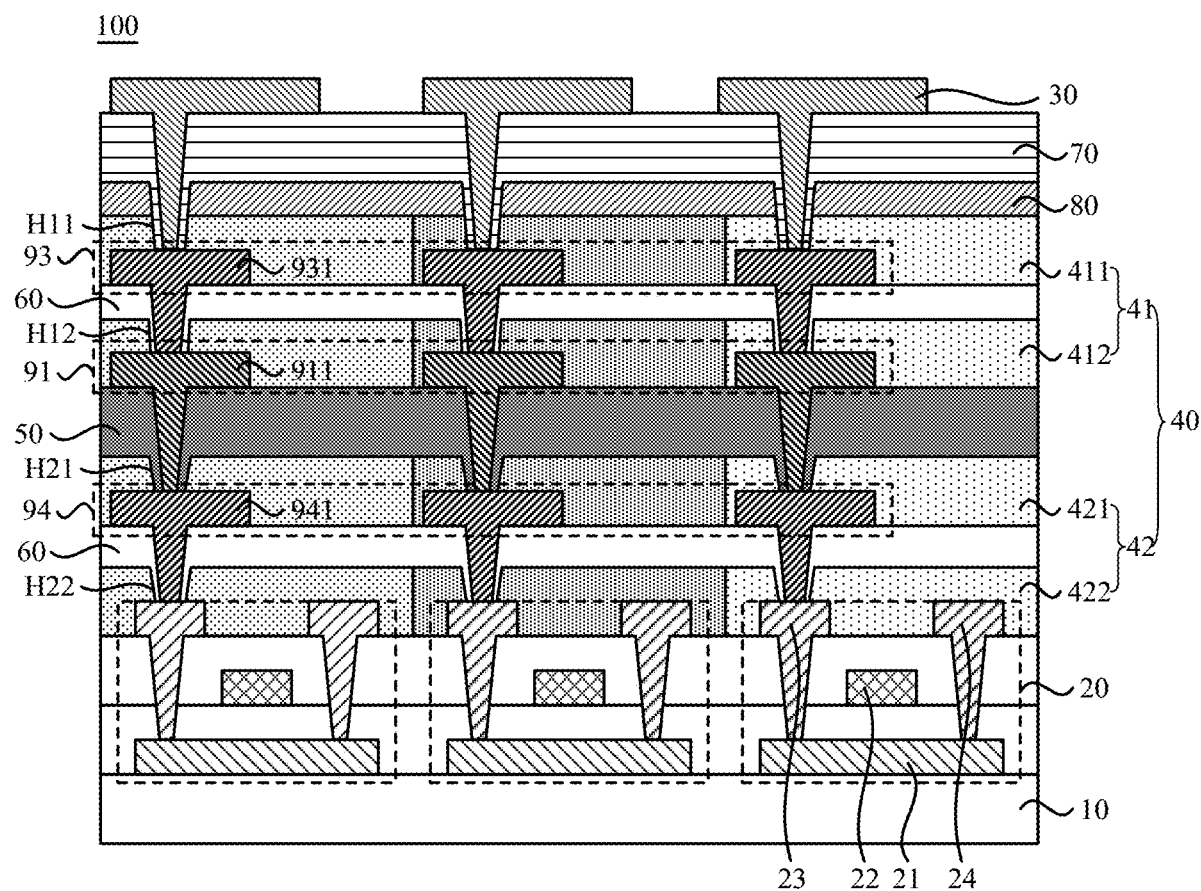
FIG. 23 is a diagram illustrating the layer structure of another array substrate according to an embodiment of the present application.

Exemplarily, FIG. 23 is a diagram illustrating the layer structure of another array substrate according to an embodiment of the present application. As shown in FIG. 23, the at least two color resist layers 40 in the array substrate 100 include two first color resist layers 41 (411 and 412) and two second color resist layers 42 (421 and 422). The planarization layer 50 is disposed between the adjacent first color resist layers 412 and the second color resist layer 421. The third overlapping conductive layer 93 is disposed between the adjacent first color resist layers 411 and 412. The fourth overlapping conductive layer 94 is disposed between the adjacent two color resist layers 421 and 422. The first overlapping conductive layer 91 is disposed between the first color resist layer 412 and the planarization layer 50. In this case, the pixel electrode 30 may be electrically connected to the third overlapping structure 931 of the third overlapping conductive layer 93 through the first sub-via H11. The third overlapping structure 931 may be electrically connected to the first overlapping structure 911 of the first overlapping conductive layer 91 through the second sub-via H12. The first overlapping structure 911 may be electrically connected to the fourth overlapping structure 941 of the fourth overlapping conductive layer 94 through the third sub-via H21. The fourth overlapping structure 941 may be electrically connected to the first electrode 23 of the TFT 20 through the fourth sub-via H22. In this manner, the first sub-via H11, the second sub-via H12, the third sub-via H21, and the fourth sub-via H22 all have a relatively small depth. Accordingly, the via manufacturing difficulty is further reduced, the productivity and the product yield of the array substrate boosted, and the production cost of the array substrate lowered.

It is to be noted that FIG. 23 is only an exemplary drawing in an embodiment of the present application. In FIG. 23, the at least two color resist layers 40 include two first color resist layers 41 and two second color resist layers 42. In an embodiment of the present application, the at least two color resist layers may include at least two first color resist layers and at least two second color resist layers. That is, the at least two first color resist layers may include two layers, three layers, or more layers; the at least two second color resist layers may include two layers, three layers, or more layers. The number of first color resist layers may be the same as or different from the number of second color resist layers.

In one embodiment, each color resist layer in the array substrate may include color resist patterns of different colors. The color resist patterns may be a bar structure or a block structure. When the color resist patterns are a bar structure, the color resist patterns are arranged along a first direction and extend along a second direction. The first direction intersects the second direction Correspondingly, the orthographic projection of the via, penetrating through the layers between the pixel electrode and the layer carrying the first electrode of the TFT, on the substrate is disposed within an orthographic projection of the color resist patterns on the substrate. When the color resist patterns are a block structure, the color resist patterns are arranged in an array. Correspondingly, the via penetrating between the pixel electrode and the layer carrying the first electrode of the TFT is disposed between two adjacent color resist patterns with the same color.

Figure 24:
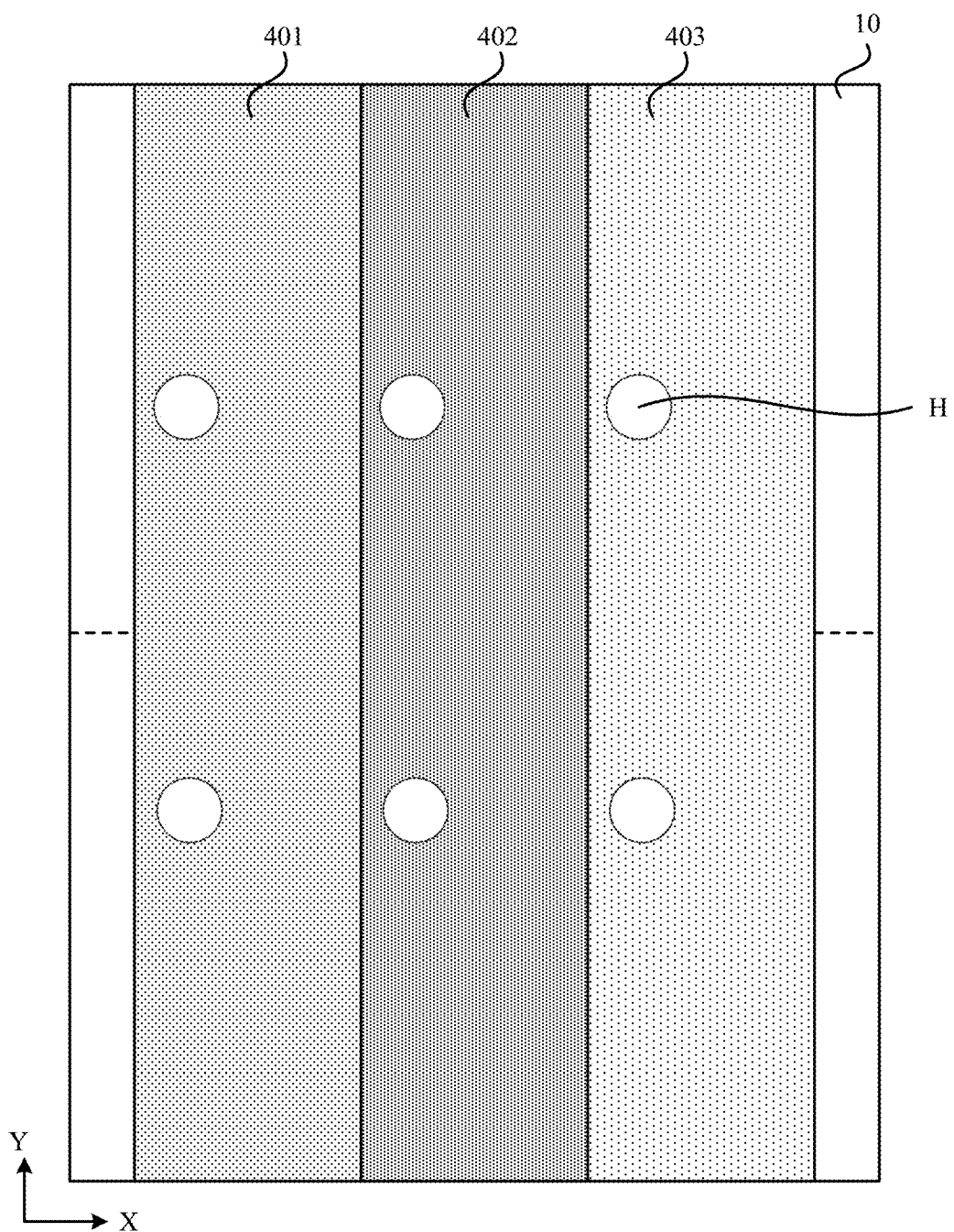
FIG. 24 is a top view illustrating the structure of an array substrate according to an embodiment of the present application.

Exemplarily, FIG. 24 is a top view illustrating the structure of an array substrate according to an embodiment of the present application. As shown in FIG. 24, each color resist layer in the array substrate may include color resist patterns of different colors. For example, each color resist layer may include a first color resist pattern 401 of a first color, a second color resist pattern 402 of a second color, and a third color resist pattern 403 of a third color. The first color, the second color, and the third color may be red, green, and blue, respectively. The first color resist pattern 401, the second color resist pattern 402, and the third color resist pattern 403 all extend along a second direction Y and are arranged along a first direction X. Since color resist layers are disposed between the pixel electrode and the TFT, a via H penetrating through layers between the pixel electrode and the layer carrying the first electrode of the TFT may penetrate through each of the color resist patterns 401, 402, and 403 in the color resist layers. Meanwhile, at least two color resist layers are disposed between the pixel electrode and the TFT. In this manner, under the premise that images displayed by the display panel equipped with the array substrate have a relatively wide color gamut, each color resist layer may be punctured separately, and a medium layer is disposed between two adjacent color resist layers to protect the color resist layer on the side of the medium layer facing the base substrate. Accordingly, the via manufacturing difficulty is reduced, the damages to the color resist patterns (401, 402, 403) caused by over-etching and the in-via residues caused by under-etching lessened, the product yield boosted, the production cost lowered, and thus the display effect enhanced.

Figure 25:
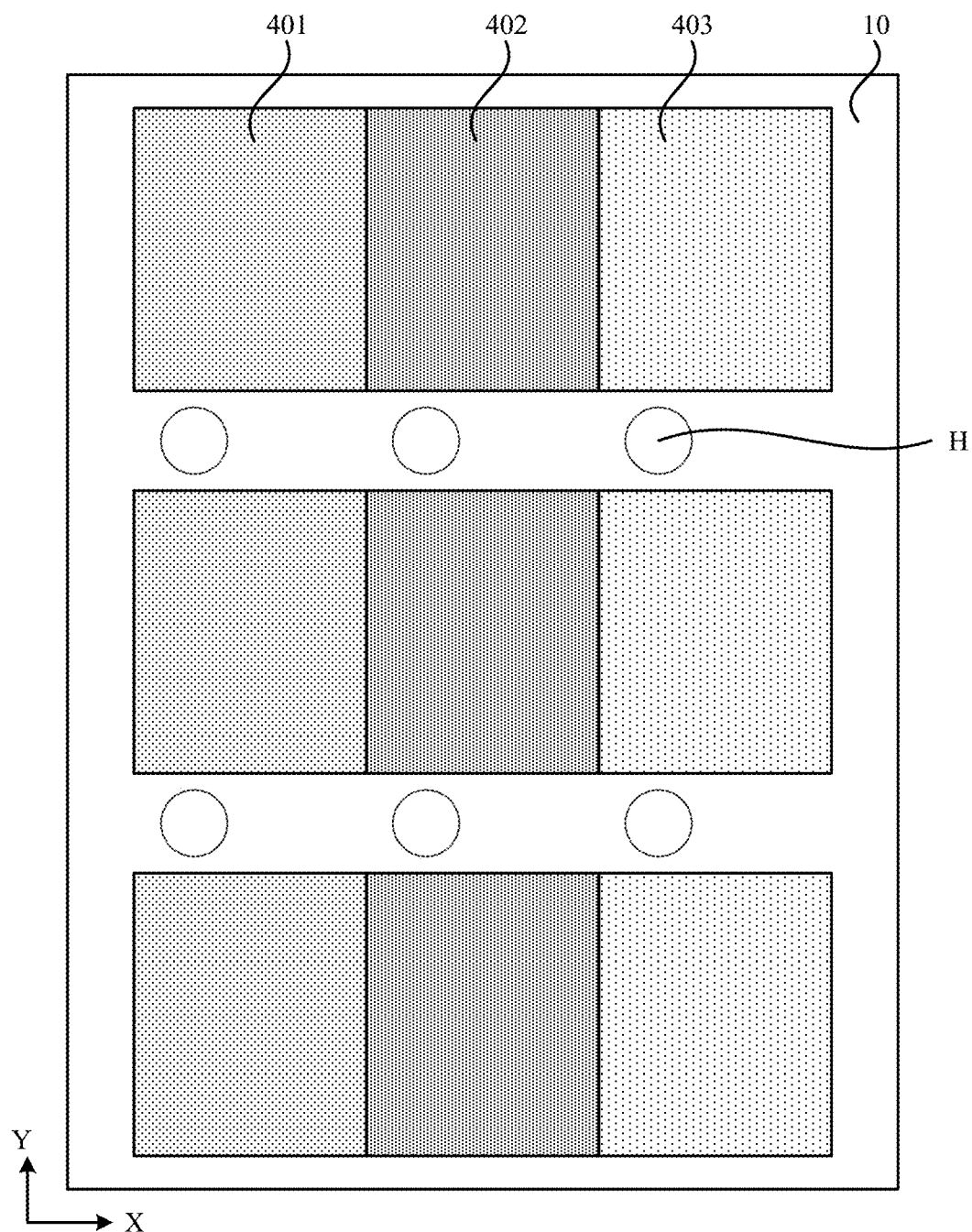
FIG. 25 is a top view illustrating the structure of another array substrate according to an embodiment of the present application.

Exemplarily, FIG. 25 is a top view illustrating the structure of another array substrate according to an embodiment of the present application. For the similarities between FIG. 25 and FIG. 24, refer to the preceding description of FIG. 24. Only the differences between FIG. 25 and FIG. 24 are exemplarily described here. As shown in FIG. 25, the color resist patterns 401, 402, and 403 in the color resist layers in the array substrate are all a block structure. The block-structured color resist patterns 401, 402, and 403 are arranged along the first direction X and the second direction Y in an array. In this case, the via H penetrating through layers between the pixel electrode and the layer carrying the first electrode of the TFT may be disposed between the two color resist patterns of the same color. For example, the via is disposed between two adjacent color resist patterns 401, between color resist patterns 402, and between color resist patterns 403. In this manner, the via H does not penetrate through the color resist patterns 401, 402, and 403. Accordingly, the color resist patterns are prevented from being damaged by puncturing, or the poor contact between the pixel electrode and the TFT caused by residues of color resist materials is avoided. Thus the product yield is boosted, the production cost lowered, and the display effect enhanced.

Figure 26:
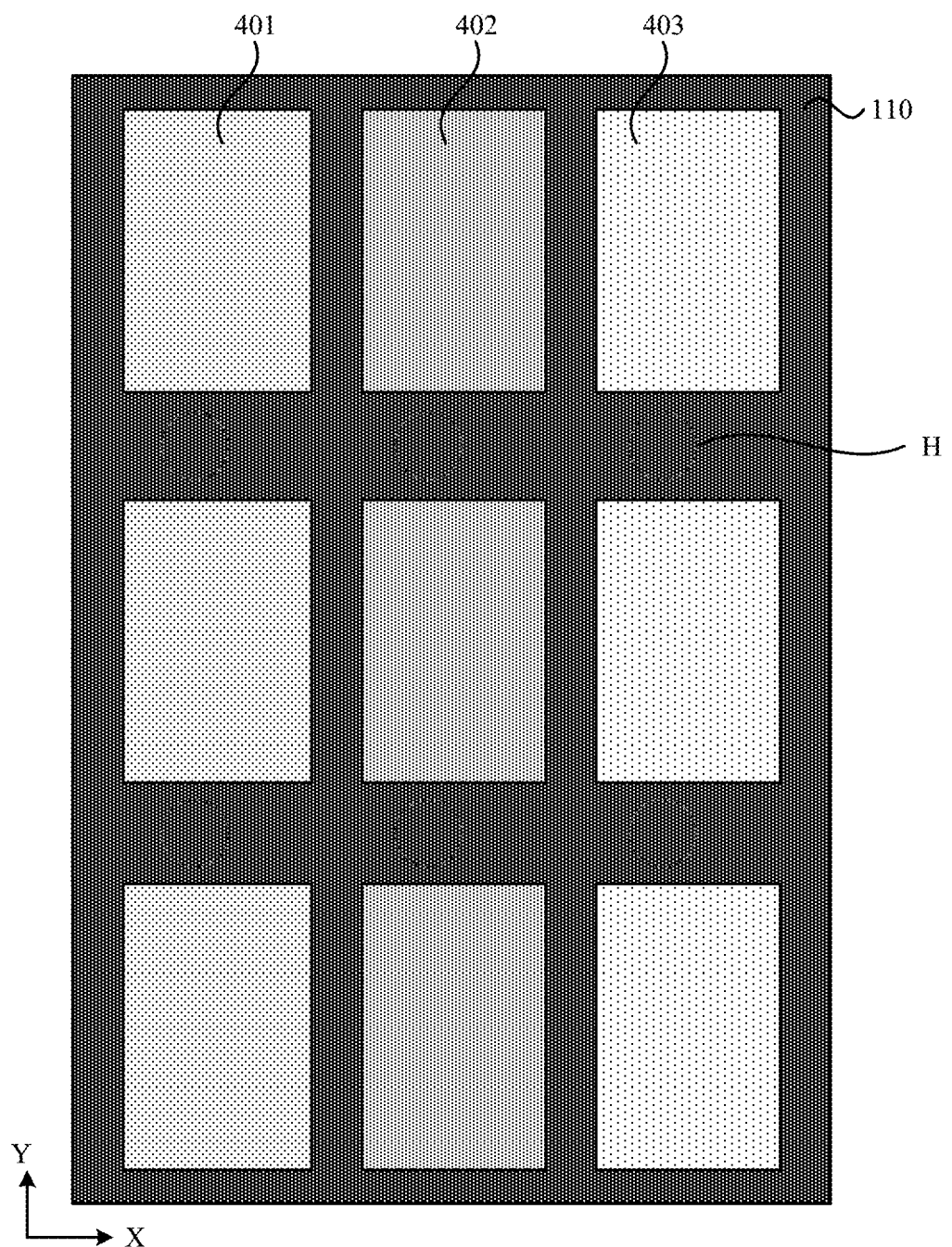
FIG. 26 is a top view illustrating the structure of another array substrate according to an embodiment of the present application.

It is to be noted that FIGS. 25 and 26 only exemplarily illustrate part of the color resist patterns in color resist layers. The color resist patterns in each color resist layer, for example, may further include the color resist patterns in white and in yellow. Meanwhile, the array substrate in an embodiment of the present application includes at least two color resist layers, each of which includes the same or different color resist patterns.

Exemplarily, FIG. 26 is a top view illustrating the structure of another array substrate according to an embodiment of the present application. The array substrate further includes a light-blocking layer 110. The light-blocking layer 110 includes a light-blocking region and first opening regions. An orthographic projection of the first opening regions on the light-blocking layer 110 is disposed within an orthographic projection of the color resist patterns 401, 402, and 403 on the base substrate 10. The orthographic projection of the via H, penetrating through layers between the pixel electrode and the layer carrying the first electrode of the TFT, on the base substrate 10 is disposed within the orthographic projection of the light-blocking region in the light-blocking layer 110 on the base substrate 10. In this manner, the light can pass through the color resist patterns 401, 402, and 403 at the position of the first opening regions in the light-blocking layer 110. Meanwhile, the light at the position of the light-blocking region in the light-blocking layer 110 is blocked to avoid light leakage caused by the via manufacturing and thus further improve the display effect.

Figure 27:
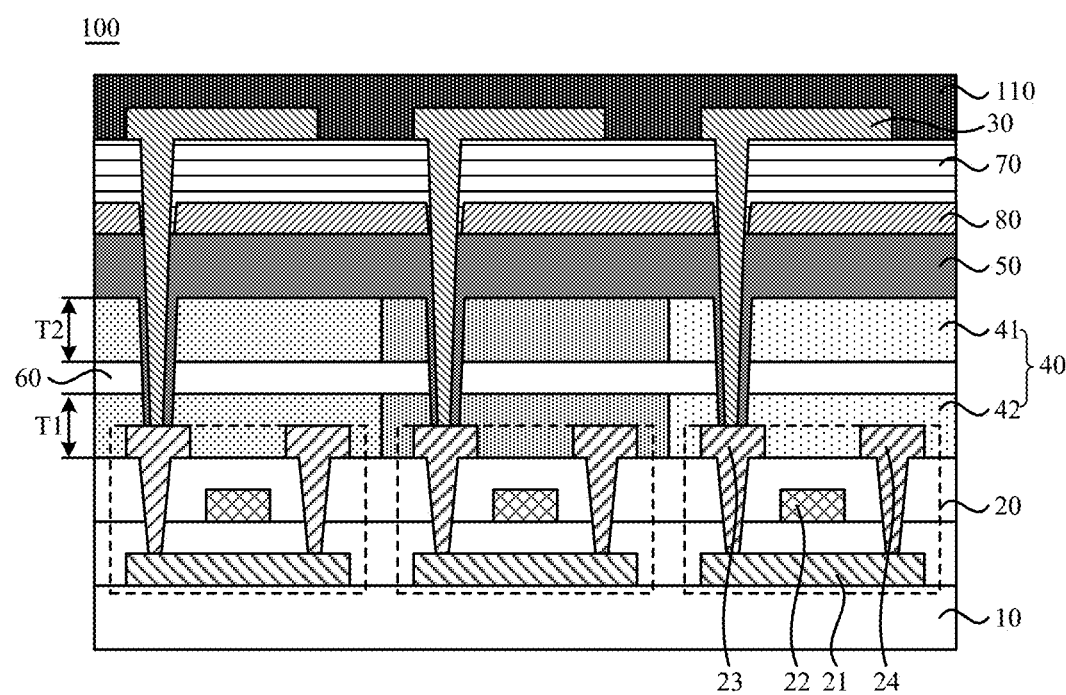
FIG. 27 is a diagram illustrating the layer structure of another array substrate according to an embodiment of the present application.

Exemplarily, FIG. 27 is a diagram illustrating the layer structure of another array substrate according to an embodiment of the present application. FIG. 27 shows an example in which the color resist patterns in the color resist layers 41 and 42 in the array substrate 100 are all a bar structure. The light-blocking layer 110 may be disposed on the side of the pixel electrode 30 facing away from the base substrate 10. Accordingly, the light-blocking layer 110 can block each layer at the position of the light-blocking region in the light-blocking layer 110, and, under the premise of avoiding light leakage, block the reflected light of each layer at the position of the light-blocking region. In this manner, light leakage does not occur at the positions needing no light transmission on the display panel equipped with the array substrate 100, and thus the display effect of the display panel is enhanced.

Additionally, the light-blocking layer 110 is disposed in the array substrate 100. With this arrangement, when array substrate 001 is bent to deform, inaccurate alignment may not occur between the position of the light-blocking region on the light-blocking layer 110 and a position to be blocked in the array substrate 001. Accordingly, the extruding leakage and the metal leakage caused by bending deformation do not occur, and thus the display effect of the curve-shaped display panel equipped with the array substrate 100 is enhanced.

In one embodiment, each color resist layer includes color resist patterns of different colors. The array substrate includes sub-pixels of different colors. Each sub-pixel includes a light transmission region and a light non-transmission region surrounding the light transmission region. The color resist patterns are disposed at least in the light transmission region. At least one color resist layer includes a first color resist pattern and a second color resist pattern. The color of the first color resist pattern differs from the color of the second color resist pattern. The sub-pixels of different colors include a first sub-pixel and a second sub-pixel. The first color resist pattern is disposed at least within the light transmission region of the first sub-pixel. The second color resist pattern is disposed within the light transmission region of the second sub-pixel, the light non-transmission region of the second sub-pixel, and the light non-transmission region of the first sub-pixel. The via is disposed between the light transmission regions of two adjacent sub-pixels of the same color. In one embodiment, a via disposed between the light transmission regions of two adjacent first sub-pixels of the same color is a first pixel via. The first pixel via is disposed between two adjacent first color resist patterns of the same color.

Figure 28:
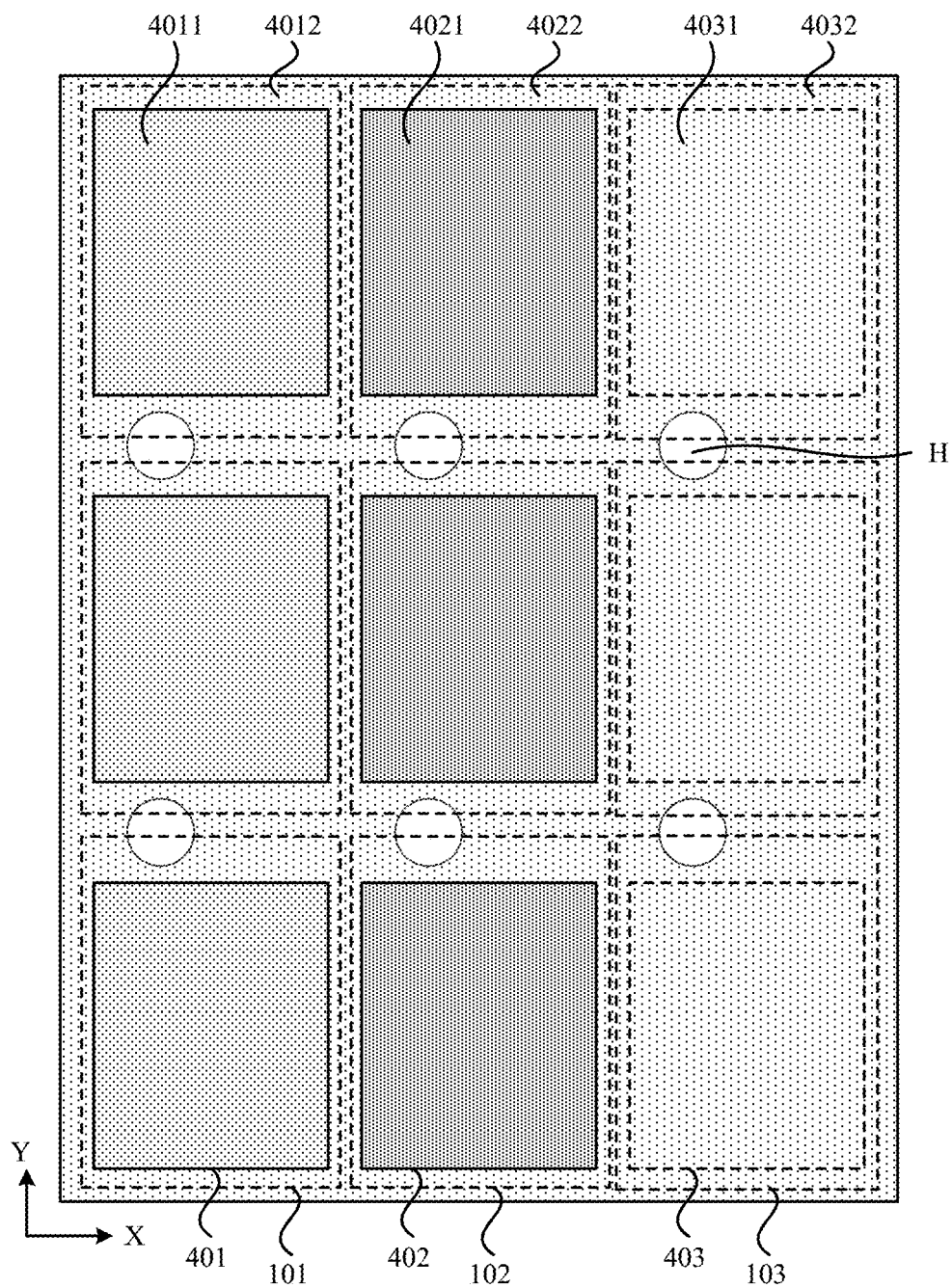
FIG. 28 is a top view illustrating the structure of another array substrate according to an embodiment of the present application.
Figure 29:
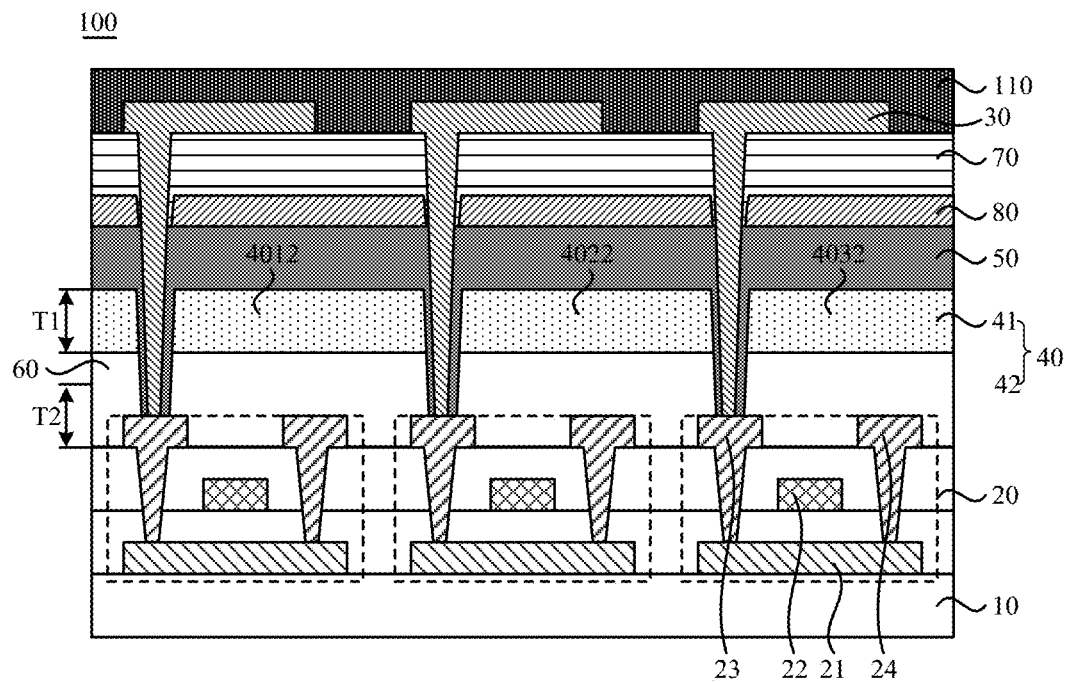
FIG. 29 is a diagram illustrating the layer structure of an array substrate corresponding to FIG. 28.

Exemplarily, FIG. 28 is a top view illustrating the structure of another array substrate according to an embodiment of the present application. FIG. 29 is a diagram illustrating the layer structure of an array substrate corresponding to FIG. 28 As shown in FIGS. 28 and 29, the array substrate 100 includes sub-pixels of different colors. Each sub-pixel includes a light transmission region and a light non-transmission region. The sub-pixels of different colors include first sub-pixels (101, 102) and a second sub-pixel 103. For example, the light-emitting color of the first sub-pixel 101 may be red; the light-emitting color of the first sub-pixel 102 may be green; the light-emitting color of the second sub-pixel 103 may be blue. The first sub-pixel 101 includes a light transmission region 4011 and a light non-transmission region 4012. The first sub-pixel 102 includes a light transmission region 4021 and a light non-transmission region 4022. The second sub-pixel 103 includes a light transmission region 4031 and a light non-transmission region 4032. Correspondingly, the at least two color resist layers 40 in the array substrate 100 include the color resist layer 41 and the color resist layer 42. The color resist patterns in the color resist layer 42 may be a block structure. The color resist patterns in the color resist layer 41 may include first color resist patterns (401 and 402) of a block structure and a second color resist pattern 403 of a plane structure. The first color resist pattern 401 may be in red, the first color resist pattern 402 in green, and the second color resist pattern 403 in blue. The plane-shaped second color resist pattern 403 is provided with a second opening structure. The first color resist patterns 401 and 402 are respectively disposed within different second opening structures. In this case, the first color resist pattern 401 is disposed at least within the light transmission region 4011 of the first sub-pixel 101. The first color resist pattern 402 is disposed at least within the light transmission region 4021 of the first sub-pixel 102. The second color resist pattern 403 is disposed at least within the light transmission region 4032 of the second sub-pixel 103. Meanwhile, the second color resist pattern 403 is also disposed within the light non-transmission region 4012 of the first sub-pixel 101, the light non-transmission region 4022 of the first sub-pixel 102, and the light non-transmission region 4032 of the second sub-pixel 103. The via H penetrating through layers between the pixel electrode 30 and the layer carrying the first electrode 23 of the TFT 20 may be disposed between two adjacent first color resist patterns 401, between two adjacent first color resist patterns 402, and between the light non-transmission regions 4032 of two adjacent second sub-pixels 103. In this manner, the via H may be prevented from damaging the first color resist patterns 401 and 402. In one embodiment, when the second color resist pattern 403 is in blue, the material of the second color resist pattern 403 has better etching performance than the material of the first color resist pattern 401 in red and the material of the first color resist pattern 402 in green. Accordingly, the puncturing at a position with the second color resist pattern 403 helps lessen the in-via residues, thus enhancing the productivity and the display effect.

It is to be noted that FIGS. 28 and 29 are only exemplary drawings in an embodiment of the present application. FIGS. 28 and 29 only exemplarily illustrate part of the color resist patterns in color resist layers. The color resist patterns in each color resist layer, for example, may further include the color resist patterns in white and in yellow. Meanwhile, the array substrate in an embodiment of the present application includes at least two color resist layers. That is, the at least two color resist layers may include two layers, three layers, or more layers. At least one color resist layer includes a first color resist pattern and a second color resist pattern. That is, all the color resist layers may include a first color resist pattern and a second color resist pattern. In one embodiment, some of the color resist layers include a first color resist pattern and a second color resist pattern, while the color resist patterns in other color resist layers may be a bar structure or a block structure.

An embodiment of the present application further provide a display panel. The display panel includes an array substrate provided in an embodiment of the present application, an opposing substrate disposed opposite to the array substrate, as well as a liquid crystal layer and a support column disposed between the opposing substrate and the array substrate. Since the display panel provided in an embodiment of the present application includes the array substrate provided in an embodiment of the present application, the display panel provided in an embodiment of the present application has the beneficial effects of the array substrate provided in an embodiment of the present application. The similarities may be referred to the preceding description of the array substrate provided in an embodiment of the present application, and are not repeated here.

Figure 30:
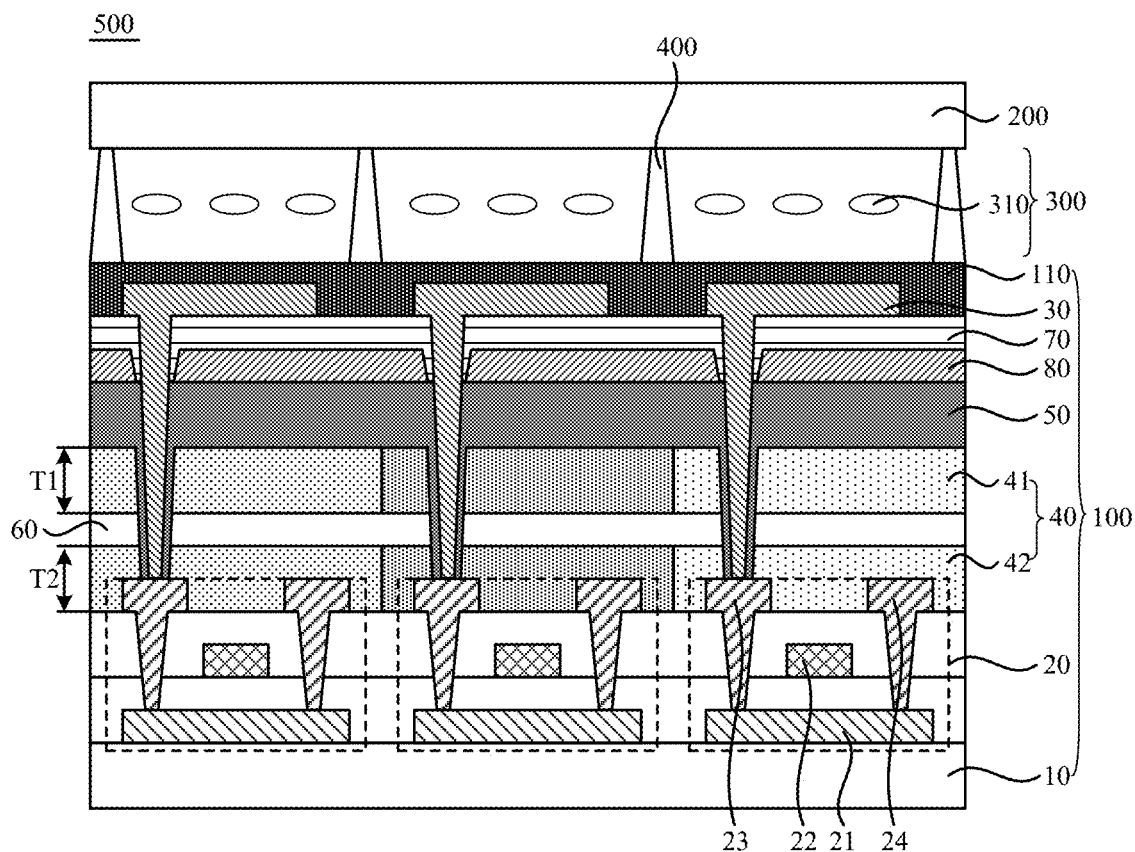
FIG. 30 is a diagram illustrating the structure of a display panel according to an embodiment of the present application.

Exemplarily, FIG. 30 is a diagram illustrating the structure of a display panel according to an embodiment of the present application. As shown in FIG. 30, a display panel 500 includes the array substrate 100 provided in an embodiment of the present application, an opposing substrate 200, as well as a liquid crystal layer 300 and a support column 400 disposed between the array substrate 100 and the opposing substrate 200. At least the TFT 20, the pixel electrode 30, and the at least two color resist layers 40 disposed between the TFT 20 and the pixel electrode 30 are disposed on one side of the base substrate 10 in the array substrate 100. Compared with a single color resist layer having the same thickness as any one of the at least two color resist layers 40, the at least two color resist layers 40 have a relatively great thickness so that the color gamut of the display panel can be widened. Additionally, the light block layer 110 is disposed in the array substrate 100 of the display panel 500. Compared with the arrangement in which a light-blocking layer and a color resist layer are disposed on a side of the opposing substrate, the displacement of the light-blocking region in the light-blocking layer due to the extruding deformation caused by bending the display panel is prevented, thus light leakage is avoided and the display effect of the display panel is improved. Meanwhile, the light-blocking layer 110 disposed on the side of the pixel electrode 30 facing away from the base substrate 10 flattens the protrusions and recesses caused by the patterning in the layer carrying the pixel electrode 30. In this manner, the support column 400 disposed between the array substrate 100 and the opposing substrate 200 is formed on a relatively planar surface. Correspondingly, the thickness difference between each position on the display panel 500 is reduced, and the display effect of the display panel 500 is enhanced. Correspondingly, the support column 400 between the array substrate 100 and the opposing substrate 200 can better support a liquid crystal cell of the display panel 500. The support column may be disposed in the light non-transmission region of each sub-pixel of the display panel 500 so that the support column 400 is prevented from affecting the light emission and display of the display panel 500.

Additionally, the common electrode 80 may be disposed in the array substrate 100 of the display panel 500. The common electrode 80 and the pixel electrode 30 may form an in-plane field to trigger liquid crystal molecules in the liquid crystal layer 300 to deflect. Accordingly, the light, after penetrating through the liquid crystal layer 300, can display corresponding images on the display surface of the display panel 500.

An embodiment of the present application further provide a display device. The display device includes the display panel provided in an embodiment of the present application. Accordingly, the display device provided in an embodiment of the present application has the effects of the preceding display panel. The similarities are not repeated hereinafter and may be understood regarding the preceding description of the display panel.

Figure 31:
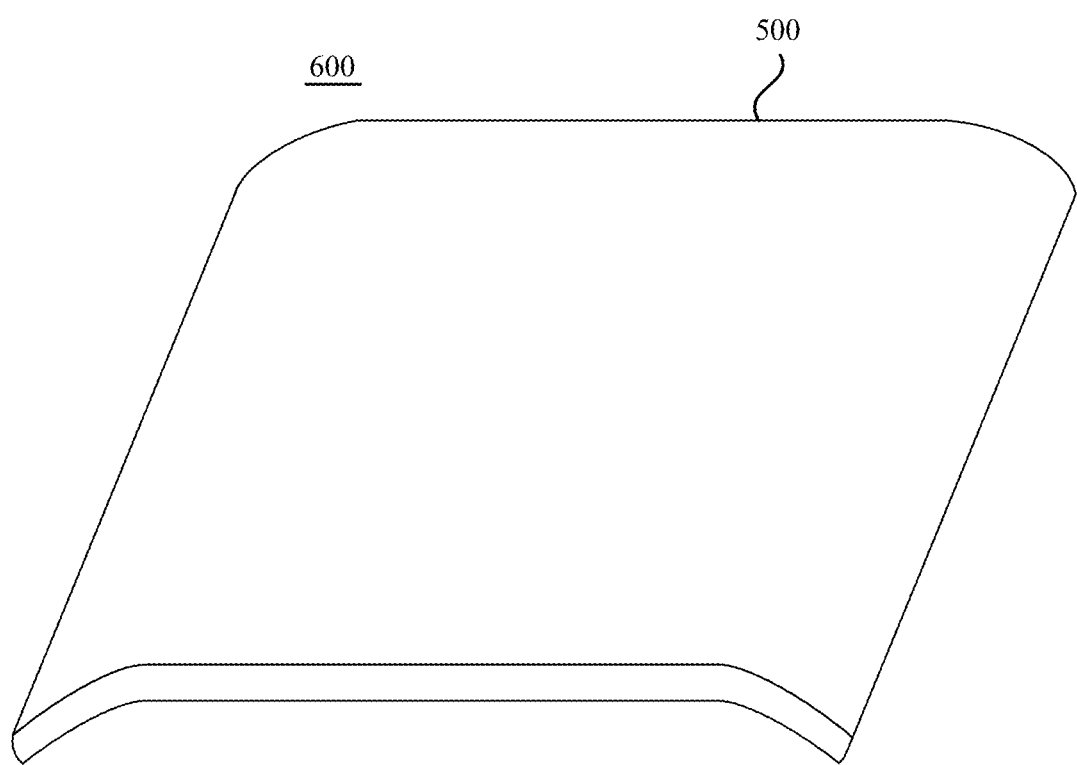
FIG. 31 is a view illustrating the structure of a display device according to an embodiment of the present application.

Exemplarily, FIG. 31 is a view illustrating the structure of a display device according to an embodiment of the present application. As shown in FIG. 31, a display device 600 includes the display panel 500 provided in an embodiment of the present application. The display device 600, for example, may be a vehicle-mounted display device with a curved surface.

An embodiment of the present application provides an array substrate, a display panel, and a display device. A TFT, a pixel electrode, and at least two color resist layers disposed between the TFT and the pixel electrode are disposed on one side of a base substrate in the array substrate. On one hand, the at least two color resist layers disposed between the TFT and the pixel electrode on the base substrate have a relatively great total thickness to satisfy the display requirement of a wide color gamut and thus enhance the display effect of the display panel. On the other hand, since a color resist layer satisfying the display requirement of a wide color gamut is divided into at least two color resist layers, each of the at least two color resist layers has a relatively less thickness compared with a single color resist layer required by the same color gamut. With a medium layer disposed between two adjacent color resist layers, the manufacturing of a via penetrating through the layers between the pixel electrode and the layer carrying the first electrode of the TFT can be implemented separately in each color resist layer. The color resist patterns on corresponding color resist layers are prevented from being damaged. Accordingly, the via manufacturing difficulty is reduced, the in-via residues and the damages to the color resist patterns on color resist layers lessened, the product yield boosted, and thus the display effect enhanced.

What is claimed is:

1. An array substrate, comprising:
    a base substrate;
    a thin-film transistor disposed on a side of the base substrate, wherein the thin-film transistor comprises at least a first electrode;
    a pixel electrode disposed on a side of the thin-film transistor facing away from the base substrate; and
    at least two color resist layers disposed between the thin-film transistor and the pixel electrode, wherein a medium layer is disposed between any two adjacent color resist layers of the at least two color resist layers,
    wherein the pixel electrode is electrically connected to the first electrode of the thin-film transistor through a via, and the via penetrates through the at least two color resist layers and the medium layer disposed between the any two adjacent color resist layers,
    wherein the array substrate further comprises a planarization layer disposed between the pixel electrode and the thin-film transistor, and the planarization layer is an insulating layer,
    wherein the at least two color resist layers are disposed between the planarization layer and the pixel electrode; or, the at least two color resist layers are disposed between the planarization layer and the thin-film transistor; or the at least two color resist layers comprise at least one first color resist layer and at least one second color resist layer, wherein the at least one first color resist layer is disposed between the planarization layer and the pixel electrode, and the at least one second color resist layer is disposed between the planarization layer and the thin-film transistor.

2. The array substrate of claim 1, further comprising a first overlapping conductive layer, wherein the first overlapping conductive layer comprises a first overlapping structure;
    wherein the first overlapping conductive layer is disposed on a side of the planarization layer facing away from the base substrate; and
    wherein the via comprises a first via and a second via, the pixel electrode is electrically connected to the first overlapping structure through the first via, and the first overlapping structure is electrically connected to the thin-film transistor through the second via.

3. The array substrate of claim 2, further comprising at least one second overlapping conductive layer, wherein the at least one second overlapping conductive layer comprises a second overlapping structure;
    wherein the at least one second overlapping conductive layer is disposed between two adjacent color resist layers of the at least two color resist layers, and second overlapping structures of different second overlapping conductive layers are electrically connected in sequence; and
    wherein the at least two color resist layers are disposed between the planarization layer and the pixel electrode, the first via comprises a first sub-via and a second sub-via, the pixel electrode is electrically connected to the second overlapping structure through the first sub-via, and the second overlapping structure is electrically connected to the first overlapping structure through the second sub-via; or the at least two color resist layers are disposed between the planarization layer and the thin-film transistor, the second via comprises a third sub-via and a fourth sub-via, the first overlapping structure is electrically connected to the second overlapping structure through the third sub-via, and the second overlapping structure is electrically connected to the first electrode of the thin-film transistor through the fourth sub-via.

4. The array substrate of claim 2, further comprising at least one third overlapping conductive layer, wherein the at least one third overlapping conductive layer comprises a third overlapping structure;
    wherein the at least two color resist layers comprise at least two first color resist layers and at least one second color resist layer; and
    wherein the at least one third overlapping conductive layer is disposed between two adjacent first color resist layers of the at least two first color resist layers, third overlapping structures of different third overlapping conductive layers of the at least two third overlapping conductive layers are electrically connected in sequence, the first via comprises a first sub-via and a second sub-via, the pixel electrode is electrically connected to the third overlapping structure through the first sub-via, and the third overlapping structure is electrically connected to the first overlapping structure through the second sub-via.

5. The array substrate of claim 2, further comprising at least one fourth overlapping conductive layer, wherein the at least one fourth overlapping conductive layer comprises a fourth overlapping structure;
    wherein the at least two color resist layers comprise at least one first color resist layers and at least two second color resist layers; and
    wherein the at least one fourth overlapping conductive layer is disposed between two adjacent second color resist layers of the at least two second color resist layers, fourth overlapping structures of different fourth overlapping conductive layers are electrically connected in sequence, the second via comprises a third sub-via and a fourth sub-via, the first overlapping structure is electrically connected to the fourth overlapping structure through the third sub-via, and the fourth overlapping structure is electrically connected to the first electrode of the thin-film transistor through the fourth sub-via.

6. The array substrate of claim 2, further comprising at least one third overlapping conductive layer and at least one fourth overlapping conductive layer, wherein the at least one third overlapping conductive layer comprises a third overlapping structure and the at least one fourth overlapping conductive layer comprises a fourth overlapping structure;

wherein the at least two color resist layers comprise at least two first color resist layers and at least two second color resist layer;
  wherein the at least one third overlapping conductive layer is disposed between two adjacent first color resist layers of the at least two first color resist layers, third overlapping structures of different third overlapping conductive layers are electrically connected in sequence, the at least one fourth overlapping conductive layer is disposed between two adjacent second color resist layers of the at least two second color resist layers, and fourth overlapping structures of different fourth overlapping conductive layers are electrically connected in sequence; and
  wherein the first via comprises a first sub-via and a second sub-via, the second via comprises a third sub-via and a fourth sub-via, the pixel electrode is electrically connected to the third overlapping structure through the first sub-via, the third overlapping structure is electrically connected to the first overlapping structure through the second sub-via, the first overlapping structure is electrically connected to the fourth overlapping structure through the third sub-via, and the fourth overlapping structure is electrically connected to the first electrode of the thin-film transistor through the fourth sub-via.

7. The array substrate of claim 2, wherein the first overlapping conductive layer further comprises a touch line; and
  wherein the array substrate further comprises a touch electrode, and the touch line and the touch electrode are electrically connected to each other.

8. The array substrate of claim 1, further comprising a common electrode,
  wherein the common electrode is disposed between the planarization layer and the pixel electrode.

9. The array substrate of claim 8, wherein the at least two color resist layers are disposed between the pixel electrode and the planarization layer; and
  wherein the common electrode is disposed between the planarization layer and the at least two color resist layers; or the common electrode is disposed between the pixel electrode and the at least two color resist layers; or the common electrode is disposed between two adjacent color resist layers of the at least two color resist layers.

10. The array substrate of claim 8, wherein the at least two color resist layers comprise at least one first color resist layer and at least one second color resist layer, and the at least one first color resist layer is disposed between the planarization layer and the pixel electrode; and
  wherein the common electrode is disposed between the planarization layer and the at least one first color resist layer; or the common electrode is disposed between the at least one first color resist layer and the pixel electrode; or the common electrode is disposed between two adjacent first color resist layers of the at least one first color resist layer.

11. The array substrate of claim 8, wherein at least one insulating layer is disposed between the common electrode and the pixel electrode.

12. The array substrate of claim 1, wherein each of the at least two color resist layers comprises a plurality of color resist patterns of different colors,
  wherein each of the plurality of color resist patterns is in a stripe shape, the plurality of color resist patterns are arranged along a first direction and extend along a second direction, the first direction intersects the second direction, and an orthographic projection of the via on the base substrate is disposed within an orthographic projection of the plurality of color resist patterns on the base substrate; or each of the plurality of color resist patterns is in a block shape, the plurality of color resist patterns are arranged in an array, and the via is disposed between two adjacent color resist patterns of a same color of the plurality of color resist patterns.

13. The array substrate of claim 12, further comprising a light-blocking layer,
  wherein the light-blocking layer comprises a light-blocking region and a plurality of first opening regions, an orthographic projection of the plurality of first opening regions on the base substrate is disposed within an orthographic projection of the plurality of color resist patterns on the base substrate, and the orthographic projection of the via on the base substrate is disposed within an orthographic projection of the light-blocking region on the base substrate.

14. The array substrate of claim 1, wherein each of the at least two color resist layers comprises a plurality of color resist patterns of different colors, the array substrate comprises a plurality of sub-pixels of different colors, each of the plurality of sub-pixels comprises a light transmission region and a light non-transmission region surrounding the light transmission region, and the plurality of color resist patterns are disposed at least within the light transmission region;
  wherein at least one of the at least two color resist layers comprises a first color resist pattern and a second color resist pattern, a color of the first color resist pattern differs from a color of the second color resist pattern, the plurality of sub-pixels of different colors comprise a first sub-pixel and a second sub-pixel, the first color resist pattern is disposed at least within a light transmission region of the first sub-pixel, the second color resist pattern is disposed within a light transmission region of the second sub-pixel, a light non-transmission region of the second sub-pixel, and a light non-transmission region of the first sub-pixel, and the via is disposed between light transmission regions of two adjacent sub-pixels of a same color among the plurality of sub-pixels; and
  wherein a via disposed between light transmission regions of two adjacent first sub-pixels of a same color is a first pixel via, and the first pixel via is disposed between two adjacent first color resist patterns of a same color.

15. A display panel, comprising:
  an array substrate, comprising:
    a base substrate;
    a thin-film transistor disposed on a side of the base substrate, wherein the thin-film transistor comprises at least a first electrode;
    a pixel electrode disposed on a side of the thin-film transistor facing away from the base substrate; and
    at least two color resist layers disposed between the thin-film transistor and the pixel electrode, wherein a medium layer is disposed between any two adjacent color resist layers of the at least two color resist layers,
  wherein the pixel electrode is electrically connected to the first electrode of the thin-film transistor through a via, and the via penetrates through the at least two color resist layers and the medium layer disposed between the any two adjacent color resist layers;
  an opposing substrate disposed opposite to the array substrate; and a liquid crystal layer and a support column that are disposed between the opposing substrate and the array substrate,
    wherein the array substrate further comprises a planarization layer disposed between the pixel electrode and the thin-film transistor, and the planarization layer is an insulating layer,
    wherein the at least two color resist layers are disposed between the planarization layer and the pixel electrode; or, the at least two color resist layers are disposed between the planarization layer and the thin-film transistor; or the at least two color resist layers comprise at least one first color resist layer and at least one second color resist layer, wherein the at least one first color resist layer is disposed between the planarization layer and the pixel electrode, and the at least one second color resist layer is disposed between the planarization layer and the thin-film transistor.

16. A display device, comprising:
a display panel, comprising:
an array substrate, comprising:
    a base substrate;
    a thin-film transistor disposed on a side of the base substrate, wherein the thin-film transistor comprises at least a first electrode;
    a pixel electrode disposed on a side of the thin-film transistor facing away from the base substrate; and
    at least two color resist layers disposed between the thin-film transistor and the pixel electrode, wherein a medium layer is disposed between any two adjacent color resist layers of the at least two color resist layers,
wherein the pixel electrode is electrically connected to the first electrode of the thin-film transistor through a via, and the via penetrates through the at least two color resist layers and the medium layer disposed between the any two adjacent color resist layers;
    an opposing substrate disposed opposite to the array substrate; and
a liquid crystal layer and a support column that are disposed between the opposing substrate and the array substrate,
    wherein the array substrate further comprises a planarization layer disposed between the pixel electrode and the thin-film transistor, and the planarization layer is an insulating layer,
    wherein the at least two color resist layers are disposed between the planarization layer and the pixel electrode; or, the at least two color resist layers are disposed between the planarization layer and the thin-film transistor; or the at least two color resist layers comprise at least one first color resist layer and at least one second color resist layer, wherein the at least one first color resist layer is disposed between the planarization layer and the pixel electrode, and the at least one second color resist layer is disposed between the planarization layer and the thin-film transistor.

* * * * *